(12) United States Patent
Bergstrom et al.

(10) Patent No.: US 10,035,301 B2
(45) Date of Patent: Jul. 31, 2018

(54) UNIDIRECTIONAL REINFORCEMENT, A METHOD OF PRODUCING A REINFORCEMENT AND THE USE THEREOF

(71) Applicant: Ahlstrom Corporation, Helsinki (FI)

(72) Inventors: Rainer Bergstrom, Mikkeli (FI); Ulla Kosonen, Mikkeli (FI); Rami Haakana, Kotka (FI); Maija Hoikkanen, Mikkeli (FI)

(73) Assignee: Ahlstrom-Munksjo Oyj, Helsinki (FI)

( * ) Notice: Subject to any disclaimer, the term of this patent is extended or adjusted under 35 U.S.C. 154(b) by 17 days.

(21) Appl. No.: 15/251,780

(22) Filed: Aug. 30, 2016

(65) Prior Publication Data

US 2016/0375633 A1 Dec. 29, 2016

Related U.S. Application Data

(63) Continuation of application No. 15/038,405, filed as application No. PCT/EP2014/075301 on Nov. 21, 2014.

(30) Foreign Application Priority Data

Nov. 22, 2013 (EP) ...................................... 13193998

(51) Int. Cl.
*B29C 65/48* (2006.01)
*F03D 1/06* (2006.01)
(Continued)

(52) U.S. Cl.
CPC .............. *B29C 65/48* (2013.01); *B29B 11/16* (2013.01); *B29B 15/12* (2013.01); *B29C 70/20* (2013.01);
(Continued)

(58) Field of Classification Search
None
See application file for complete search history.

(56) References Cited

U.S. PATENT DOCUMENTS 5,484,642 A 1/1996 Bompard et al.
6,995,099 B1 * 2/2006 Nishimura ............ B29C 70/083
428/113
(Continued)

FOREIGN PATENT DOCUMENTS

EP 0 193 478 9/1986
EP 1 072 711 1/2001
(Continued)

OTHER PUBLICATIONS

International Search Report and Written Opinion cited in PCT/EP2014/075301, dated May 8, 2015, 21 pages.

*Primary Examiner* — David Sample
*Assistant Examiner* — Donald M Flores, Jr.
(74) *Attorney, Agent, or Firm* — Nixon & Vanderhye P.C.

(57) ABSTRACT

A unidirectional reinforcement and a method of producing a unidirectional reinforcement that may be used in applications where high quality and strength is required. The unidirectional reinforcement includes transversely arranged discrete Z-direction resin flow facilitating means running back and forth between the longitudinal edges of the sheets, and traveling between the groups of rovings and between the top and bottom surfaces of the unitary web.

20 Claims, 7 Drawing Sheets

(51) Int. Cl.
 *D05B 3/00* (2006.01)
 *B29C 70/50* (2006.01)
 *B29C 70/48* (2006.01)
 *B29C 70/54* (2006.01)
 *B29B 11/16* (2006.01)
 *B29C 70/22* (2006.01)
 *D04H 3/04* (2012.01)
 *D04H 3/115* (2012.01)
 *B29B 15/12* (2006.01)
 *B29C 70/20* (2006.01)
 *D04H 3/12* (2006.01)
 *B29L 31/08* (2006.01)
 *B29K 105/08* (2006.01)

(52) U.S. Cl.
 CPC ............ *B29C 70/226* (2013.01); *B29C 70/48* (2013.01); *B29C 70/50* (2013.01); *B29C 70/547* (2013.01); *D04H 3/04* (2013.01); *D04H 3/115* (2013.01); *D04H 3/12* (2013.01); *D05B 3/00* (2013.01); *F03D 1/0675* (2013.01); *B29K 2105/08* (2013.01); *B29L 2031/085* (2013.01); *D10B 2101/06* (2013.01); *D10B 2505/02* (2013.01); *F05B 2230/21* (2013.01); *F05B 2230/23* (2013.01); *F05B 2240/21* (2013.01); *F05B 2280/4007* (2013.01); *F05B 2280/6003* (2013.01); *Y02E 10/721* (2013.01); *Y02P 70/523* (2015.11)

(56) References Cited

U.S. PATENT DOCUMENTS

| | | | |
|---|---|---|---|
| 2004/0170554 A1* | 9/2004 | Wadahara | B29B 11/16 423/447.2 |
| 2011/0243750 A1* | 10/2011 | Gruhn | B29B 11/16 416/226 |
| 2015/0183184 A1* | 7/2015 | Bergstrom | B29C 70/547 112/440 |
| 2015/0204000 A1* | 7/2015 | Bergstrom | B29C 70/547 442/352 |

FOREIGN PATENT DOCUMENTS

| | | | |
|---|---|---|---|
| EP | 1 419 875 | 5/2004 | |
| EP | 1419875 A1 * | 5/2004 | ........... B29C 70/226 |
| EP | 1 491 323 | 12/2004 | |
| EP | 2 233 625 | 9/2010 | |
| EP | 1 667 838 | 11/2010 | |
| FR | 1 394 271 | 4/1965 | |
| FR | 2 594 858 | 8/1987 | |
| WO | 02/070806 | 9/2002 | |

* cited by examiner

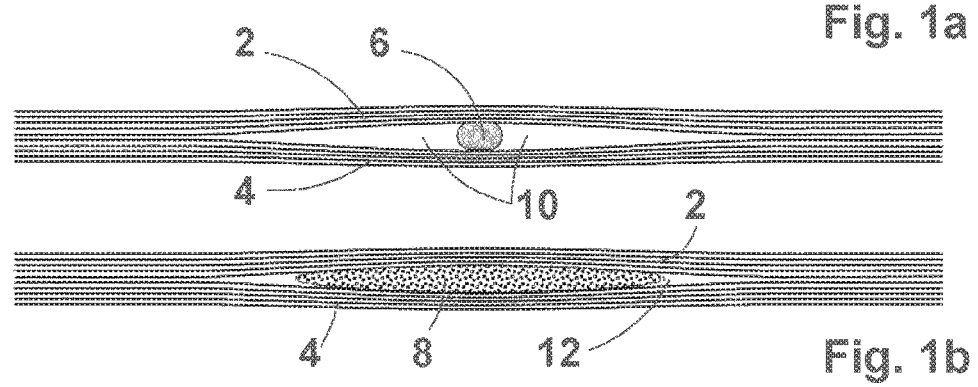
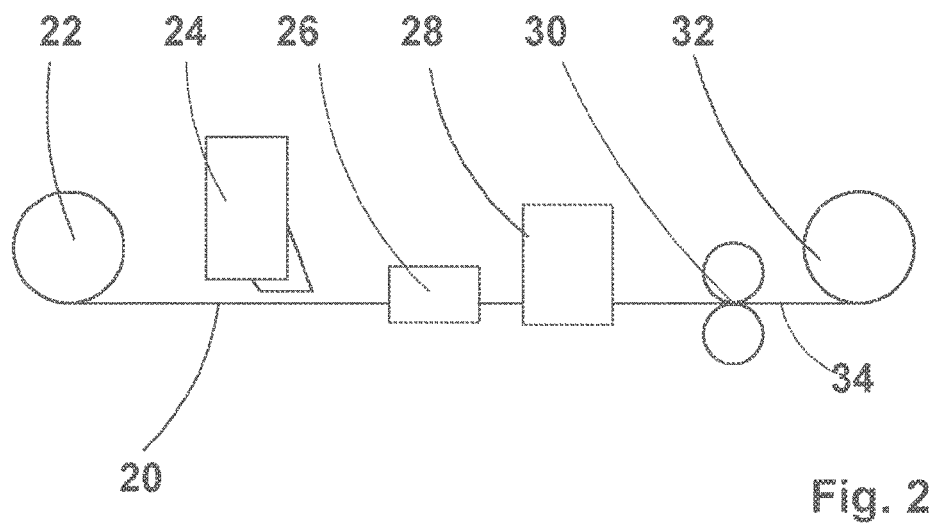

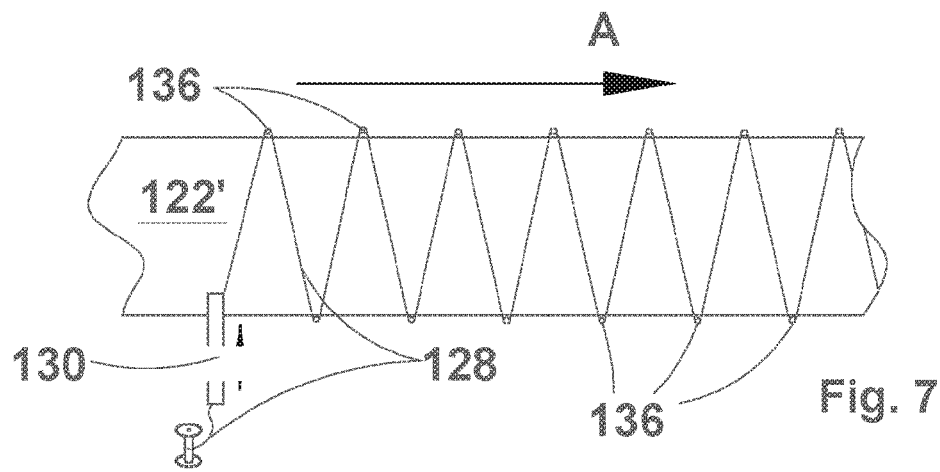
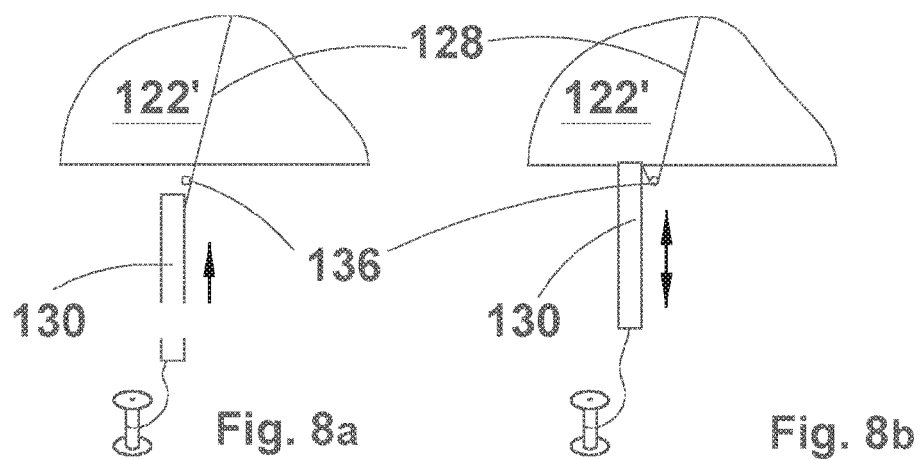
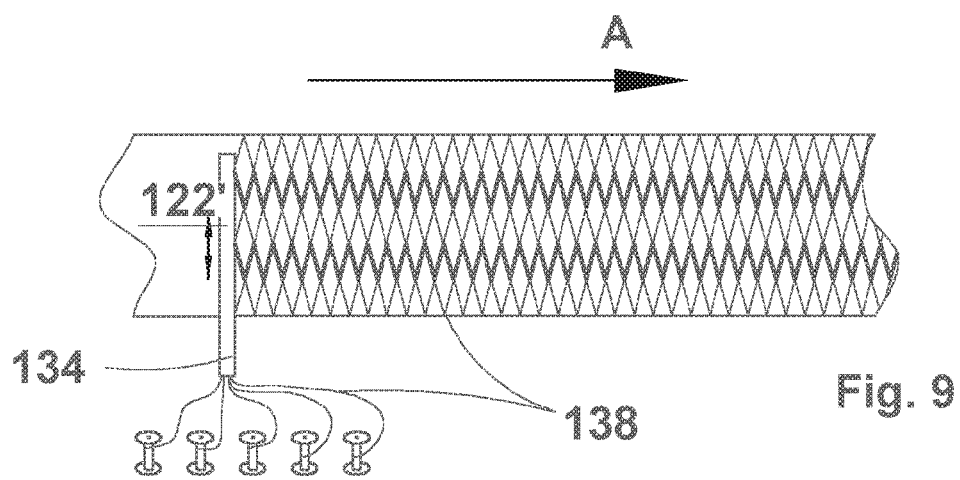

UNIDIRECTIONAL REINFORCEMENT, A METHOD OF PRODUCING A REINFORCEMENT AND THE USE THEREOF

RELATED APPLICATIONS

This application is a continuation of U.S. patent application Ser. No. 15/038,405 filed May 20, 2016, which is the U.S. national phase of International Application No. PCT/EP2014/075301 filed 21 Nov. 2014 which designated the U.S. and claims priority to EP 13193998.5 filed 22 Nov. 2013, the entire contents of these applications are incorporated by reference.

TECHNICAL FIELD

The present invention relates to a unidirectional reinforcement, a method of producing a unidirectional reinforcement and the use thereof. The unidirectional reinforcement of the present invention may be used in all such applications that reinforcements are generally needed and especially in such applications where the Closed Mold Method is used. The Closed Mold Method typically means the use of Vacuum Infusion technology or Resin Transfer Molding (RTM) or Light RTM technology for distributing the resin in the mold in applications where especially high quality and strength for the end product is required. The unidirectional reinforcement of the present invention is especially applicable in the manufacture of spar cap laminates for wind turbine blades, automotive parts, boats, various strength members etc., i.e. in all such structures that longitudinal forms are needed.

BACKGROUND ART

When manufacturing composite and laminate products using various fibers, like for instance glass, carbon and aramid fibers as well as flax, hemp, jute, kenaf, basalt and other natural fibers etc. for the manufacture of, for instance, boat, automotive and wind turbine parts, for example, the manufacture starts with the production of appropriate fiber reinforcements like woven or knitted structures, which may have a unidirectional or multi-axial orientation. The structures are, then, placed in a mold used in the manufacture of the intermediate or end product. The mold has, naturally, the shape of the end product meaning that the shape may sometimes be very complicated, and require substantial shaping of the reinforcement when placed in the mold. Normally several layers, up to tens of layers, of reinforcements are stacked one on top of another in the mold and a thermosetting resin like epoxy mixed with hardener or unsaturated polyester resin or vinyl ester is introduced in the mold for forming a fiber-reinforced composite article. Resin may also be thermoplastic like PA (polyamide) or CBT (Cyclic Polybutylene Terephthalate) or alike. Practice has shown that when the end product has to resist high mechanical loads, unidirectional reinforcements, which may be held together in transverse direction by means of stitching, are a preferred choice in its manufacture as they may be oriented efficiently according to loads. Such unidirectional reinforcements are made of rovings or tows, generally called as reinforcing fibers.

The unidirectional reinforcement is normally formed of a single layer of reinforcing rovings. The construction of the reinforcement depends on the target areal weight and the tex number of the rovings. For instance if a high areal weight is desired, a thick roving (for example with E-glass 2400 tex) is used, and where a reinforcement with low areal weight is desired, a thin roving (for example with E-glass 600 tex) is used in its manufacture.

The end product, i.e. the cured laminate structure may be made of a number of such unidirectional reinforcements either by arranging the layers of reinforcements such that, in the end product, the rovings of each layer are parallel or some layers are oriented in other directions according to loads the laminate construction is subjected to or by first manufacturing fabrics of several layers of unidirectional reinforcements so that the rovings of adjacent layers form a certain angle, and thereafter using the fabrics thus formed in the production of the end product. Such fabrics are called biaxial, triaxial, quadraxial etc. fabrics depending on the number of different fiber orientations therein.

A unidirectional reinforcement is inherently unstable in nature as yarns run in one direction only. In order to be able to handle the unidirectional reinforcement, its rovings have to be anchored or bonded to each other in a suitable manner. Prior art knows, in principle, two different mechanical methods for such a purpose.

One method is to secure the rovings by means of stitching (e.g. warp knitting). The stitching yarns form knitting loops, i.e. stitches, which are holding the actual reinforcing rovings, in their place in the reinforcement. The stitches are formed by various knitting elements, e.g. by needles, which penetrate the layer or layers of reinforcing fibers according to the known warp knitting technique.

Another mechanical method is to use weaving technique to anchor the longitudinal warp yarns with light weight weft yarns in their respective place. As weft yarns both non-coated and hot-melt coated yarns have been used. After heating and cooling the hot melt binder has given the reinforcement considerable stability. Yet the weaving alternative is not any more considered favorable as the reinforcing yarns form kinks when crossing over the weft yarns leading to stress concentrations and lower mechanical properties than knitted versions. The hot melt binder yarns have, when used, been found to create local disturbance in matrix curing and are not favored any more in the trade. Typically, the weft yarns are multifilament yarns that get flat under compression irrespective of their being hot-melt yarns or not.

EP-A1-2233625 discusses a unidirectional reinforcing fiber woven fabric in which reinforcing fiber yarns arranged in one direction in parallel to each other are held at a predetermined formation by bundling of auxiliary weft yarns and auxiliary warp yarns. Each auxiliary weft yarn runs on one surface of the fabric in transverse direction to the reinforcing fiber yarns. The auxiliary weft yarns are arranged alternately on both surfaces of the fabric. The auxiliary warp yarns run parallel with the reinforcing fiber yarns, and penetrate the fabric in a zig-zag fashion such that each auxiliary warp yarn goes round each auxiliary weft yarn, and, when doing that, binds the auxiliary weft yarn against the fabric. In other words, when interlacing the auxiliary weft yarns the auxiliary warp yarns pass the fabric from one surface to the other, and thus, separate the reinforcing fiber yarns to bundles of UD reinforcing fiber yarns. In other words, the EP-document teaches mechanical bundling of UD reinforcing fiber yarns by using a weaving machine, which is a relatively complicated machine leading to problems in the production. For instance, the weaving results, due to the layers of the fabric changing continuously their mutual position, in abrasion between the individual rovings, which easily causes filament breaks in the rovings and both lowers the product quality and increases the risk of downtime of the process. Moreover, bundling of the reinforcing rovings, tows or yarns leads to resin-rich regions between the reinforcing rovings increasing internal stresses due to resin shrinkage now taking place unevenly.

A chemical method for bonding the unidirectional rovings together by means of various thermoplastic binders has also been brought to market. Practice has shown that when the rovings are anchored to each other chemically the bonding makes the reinforcement relatively stiff, whereby it is hard to position the reinforcement in the mold, i.e. make the reinforcement follow the contours of the mold, the harder the more complex shapes the mold has. However, choosing carefully both the bonding agent, normally a thermoplastic binder, for instance in powder form, and the amount it is used, the shaping properties (mainly flexibility) of the reinforcement may be brought to an acceptable level. Other problems, in addition to the above discussed handling stiffness, involved in the chemically bonded reinforcements, have been seen in resin permeability and wet-out speed of a stack of reinforcements in a mold.

The problem relating to resin permeability and to the bonding of the rovings in the reinforcement is caused by the fact that the rovings are locally so tightly against each other in the infusion molding stage, this being emphasized by the compression force of the vacuum infusion process, that, firstly, the flow of gas from the open cavities, and secondly, the flow of resin to fill the open cavities in and between the reinforcement layers in the mold is very slow unless any specific measures are taken. As good resin permeability is vital for the practical execution of the molding process it is normally speeded up by utilizing pressure difference when feeding resin in the mold. It is common practice in the Closed Mold Method to apply either Vacuum Infusion technology or Resin Transfer Molding (RTM) or Light RTM technology with their numerous variants and flow aid materials like plastic scrims, for distributing the resin all over the reinforcement layers in the mold. However, sometimes despite various measures, like vacuum and/or raised feed pressure, small air cavities tend to remain in the reinforcement reducing significantly the strength properties of the laminate. In view of the above, new ways to improve both the removal of gas from the stack of reinforcements and the permeability of the reinforcement to resin has to be investigated.

One way to improve the permeability of the reinforcement is to provide the reinforcement with flow passages for resin, the flow passages allowing the resin to flow quickly in the reinforcement. There may be found, in prior art, numerous ways for arranging the resin flow passages in the reinforcements or between the reinforcements in a stack of reinforcements. However, it has been learned that the use of such flow passages is not very efficient, as the vacuum applied in the infusion stage tends to shift or draw rovings from the neighboring areas or reinforcements and even shift their positions to fill the flow passages/cavities.

EP-A1-1491323 discloses a reinforcement structure comprising unidirectional reinforcement threads and transverse stiffening threads. The stiffening threads are distributed in a spaced manner on a layer of reinforcement threads. The stiffening threads may be of thermoplastic material such that by fusion or softening the stiffening threads fasten to the reinforcement threads and give the reinforcement the transverse stability it needs. For ensuring sufficient capillary draining of injected resin the layer of longitudinal reinforcement threads is provided with longitudinal draining threads, which are, thus, parallel to one another and to the reinforcement threads. The draining threads are arranged in spaced manner in the layer of reinforcement threads. The draining threads may be formed of glass fibres covered with fibres of sufficient capillarity, like for instance cotton fibers or cellulosic fibers, to drain the injected resin. Another option for the draining threads is reinforcement threads on each of which a monofilament is wound around. Thus a spiral flow passage for the resin is formed. Therefore, it is clear that the flow passages in the reinforcement are formed in the longitudinal direction of the reinforcement.

EP-B1-1667838 discusses the formation of flow passages in a composite fabric formed of a plurality of substantially parallel, coaxially aligned tow groups, each of said tow groups having one or more tows wherein a portion of said tow groups contain two or more tows. The flow of resin along within the fabric is planned to be ensured by arranging spacing between tows in a tow group to be less than the spacing between adjacent tow groups. Thus the spacing between adjacent tow groups should form the required flow passages. Such flow passages should permit resin to flow through the fabric, especially in the direction of the tows, i.e. in the longitudinal direction of the product.

With regard to both above referred documents the longitudinal resin flow means, in practice, that the longer the products to be manufactured are the more complex and, at least time consuming, is the impregnation of the end product with resin. In practice, it is impossible to think about impregnating a spar cap of a wind turbine blade having a length of 50 meters or more economically by lengthwise impregnation. However, as the length of the end product increases it has to be understood that at a certain point the impregnation in longitudinal direction reaches its practical limit, i.e. the so called wet-out distance, whereafter other ways have to be taken into serious consideration. As another problem, practical experiments have shown that the flow passages will be filled with rovings from nearby areas when vacuum is applied in the infusion stage or the laminate structure becomes corrugated with local kinks in reinforcing rovings reducing mechanical strength. One way of solving the above problems is a possibility to arrange resin injections at, for instance, 2 meter intervals over the entire length of a blade, but it is a complicated and time consuming method and, therefore, very expensive.

U.S. Pat. No. 5,484,642 discusses a textile reinforcing material useful for producing composite laminated articles by a general injection-molding technique. The reinforced material, i.e. laminate structure is fabricated by arranging a stack of layers having textile reinforcements in a mold of a shape corresponding to that of the article to be fabricated and, after the mold has been closed, injecting a resin into it. The textile reinforcements may be of woven or non-woven origin including unidirectional slivers. The transverse stability of the reinforcement layers is accomplished by means of weaving, knitting or stitching or by using transverse binding threads or yarns. At least one layer of the stack of textile reinforcements has a structure in which ducts, i.e. flow passages for resin, extend in at least one direction therein to facilitate the flow of the resin during injection. The ducts may be located in longitudinal and/or transverse direction of the material. The main idea behind the above mentioned US patent is to ensure good resin flow properties for the fabric by changing a part of the reinforcing yarns to better withstand compression due to mold closure and vacuum. This is done typically by adding twist to a part of the reinforcing yarns or by twining polyester multifilament yarn around carbon fiber tows. The disadvantage, however, of this concept is that among the normal reinforcing yarns a high number of relatively large yarns are placed that under laminate loading conditions behave quite differently from that of the rest of yarns in the reinforcement. This is mainly due to the often very high twist (260 TPM) that affects the elastic properties of the yarns under loading. Also, the high twist prevents or slows down the resin penetration inside these yarns. This leads to non-homogenous laminate structure where a part of the yarns carries the loads in a different manner. This will finally increase risk of premature laminate failure in static and specifically in dynamic load conditions.

One well known way of improving the impregnation of resin into a stack of reinforcements is to place in the mold both to the bottom and to the top of the stack a plastic scrim or other flow aid material by means of which the resin spreads quickly to the entire top and bottom surface area of the reinforcement. After impregnation and curing the scrims are removed labor intensively from the laminate. The purpose for the scrim is, naturally, to introduce resin quickly to the entire area of the mold so that the Z-direction impregnation of the resin into the stack of reinforcements could start as soon as possible. However, the thicker the stack is, the slower the stack is to impregnate with resin. For instance in wind turbine blades the cross section of the spar cap is almost a square, whereby, for the resin, the center of the stack is hard to reach.

It is also known that sometimes when using unidirectional reinforcements, especially in woven form, some assisting yarns have been added in transverse direction for improving transverse stability or resin flow properties. Typically the yarns are coated with hot-melt or other thermoplastic material and the yarns are of glass fiber or polyester (for instance, twisted bundles of glass filaments—each bundle having typically 60 or more filaments, each filament having a diameter of 10-15 μm) and in coated form tex number typically 100-200 tex. The thermoplastic coating of the yarns is, after weaving, molten, whereby it flows in the void volumes in connection with both the yarn and the rovings and thus bonds the warp rovings and the weft yarn together. The thermoplastic coating is usually formed of PA (Poly-Amide) or EVA (Ethylene-Vinyl Acetate) types of materials, whose melting temperature is lowered by means of waxy substances or by some other appropriate means. Therefore thermoplastic coating is typically conflicting with the infusion resin matrix as the relative amount of binder is locally very high in the immediate vicinity of the reinforcing yarn, causing local weak areas in the laminate. The glass or polyester filaments with glue remain on the rovings transverse thereto and give the reinforcement its transverse handling stability prior to infusion or alike. The resins will not reach the actual fiber surface as the fibers are coated with thermoplastic material.

The use of this kind of assisting yarns in unidirectional reinforcements will increase unnecessarily weight and possibly cause local fiber distortion, which are, by nature, undesirable effects. Furthermore transverse reinforcing fibers, i.e. for instance fibers oriented in 90, 60 or 45 degree direction, may also create micro-cracks when these fibers, normally glass fibers, are broken during the axial loading of the UD-construction from which more severe fatigue cracks destroying the stability of the end product may originate. The reason for the latter problem is the fact that elongation at break of the glass fiber yarn is significantly lower than that of the matrix in transverse direction. And still further the multifilament glass fiber yarns or rovings deform when subjected to vacuum compressing pressure losing their originally round cross section such that their cross section under pressure is oval or even flat (as shown in FIG. 1b). The multifilament yarn form has as a consequence that its individual filaments move sideways leading practically to an oval or flat cross section formation. The yarns coated with thermoplastic material behave similarly as the coating is melting during the heating-pressing stage, leading to flat form where there is a cross-over point.

Firstly, the prior art twisted threads or yarns, i.e. multifilaments used for forming the transverse flow passages have a diameter (before applying compression) of about 0.35-0.45 mm. In the performed tests a laminate was formed by placing a stack of two 1200 g/m$^2$ reinforcement layers having transverse threads of the above mentioned size between the reinforcements in a mold, subjecting the stack to vacuum, performing the infusion with resin, and allowing the laminate to harden. It was learned that the cross section of the multifilament threads was changed to oval or flat while the reinforcement layers were compressed by the applied vacuum in the infusion stage. When comparing the wet-out distance of the reinforcement to that of a reinforcement having no crosswise arranged yarns it was learned that it had not changed or improved at all or the change was, in practice, insignificant. The reason will be discussed in more detail later on.

Reinforcements provided with hot-melt weft yarns have been on the market about 20 years ago, but they have not succeeded in passing strength tests, neither static nor dynamic tests. Additionally the plastic formability of such reinforcements was poor. It is, in practice, impossible to use such reinforcements in the production of spar cap laminates for wind turbine blades as the spar caps have double-concave forms to which this kind of reinforcement cannot be bent.

Secondly, reinforcements having transverse glass fiber yarns with a thermoplastic coating have been considered. In such reinforcements the diameter of the coated yarn was of the order of 0.30-0.35 mm, and the diameter, or in fact the Z-direction thickness, of the core yarn of the order of 0.04-0.06 mm when pressed and coating melted or removed. The difference these thermoplastic coated yarns have when compared to non-coated yarns, for example stitching yarns, is that during bonding the yarns to the rovings of the reinforcement, i.e. during the softening/melting of the coating, the yarns change their shape in contact points (compression reduces the Z-direction thickness of the yarns), whereby local flow restrictions are formed. In other words, in points where the coated yarn is not compressed, its diameter remains on the original level, but in points of compression the diameter/thickness is reduced to even below the diameter of the core yarn, i.e. the core of the yarn is flattened by the compression. Another problem involved in the use of coated yarns is that the yarn is stiff and relatively thick, whereby it makes the direction of the rovings deviate sharply locally from their straight direction, i.e. forces the rovings to bend and form kinks with problems discussed already earlier as well as later on in this paragraph. A yet further problem with the coated yarns is the coating polymer itself, as it is normally not compatible with the resin and thus contaminates the laminate and thus creates weak spots in the reinforcement. Now a laminate was formed of reinforcement layers each bonded by the transverse coated glass fiber yarns to give stability. It was learned that the wet-out distance of the stack of reinforcements was mostly acceptable. But when the laminate, thus having transverse glass fiber yarns with a diameter or thickness changing between about 0.35 and about 0.04 mm, was subjected to fatigue testing, it was learned that soon after the start of the tensile-tensile fatigue testing micro cracking of the laminate was observed. When examining the laminate and especially the micro-cracks in detail it was learned that the micro-cracks were found at the junctions of the reinforcement rovings and the coated transverse yarns. A clear doubt was that the reason for the micro-cracking was the local large diameter of the thread creating bends or kinks in the rovings. Additionally, the hot melt yarns, i.e. also the core yarns, when heated, are compressible, whereby local flattened areas are created, which reduce the cross section of flow passages and thus hamper resin flow at the infusion stage.

However, it appears that holding the unidirectional reinforcement in shape or undistorted in transverse direction, i.e. the bonding of the rovings to hold the shape by means of a thermoplastic binder is probably the way the reinforcements will be made in the future, specifically if fatigue properties need to be optimized. Therefore, new ways to improve the permeability of the reinforcement to resin have been investigated.

As the starting point for the further development of an optimal unidirectional reinforcement is a reinforcement in which the problems relating to handling stability and resin permeability have been taken care of without sacrificing the strength and especially the fatigue properties. For ensuring maximal strength and fatigue properties for the laminate manufactured of this reinforcement, there should not be any yarns/fibers stretching crosswise over the reinforcement for giving the material stability in transverse direction. However, it is very difficult to handle the material during the subsequent work phases. The often heavy reinforcements are laid in the mold, for instance during the wind turbine blade production phases, often several, sometimes even 50-60 layers one on top of another, the reinforcements having a length of several meters, often up to 50-70 meters, sometimes even more. The transverse stability is needed so that the operator/s stacking the reinforcements in the mold in the blade production is/are able to adjust the exact position of each reinforcement in transverse direction. This is not possible without sufficient transversal pulling strength. If the flow passages extend in longitudinal direction continuously from one end of reinforcement to the opposite end thereof, like the EP-B1-1667838 teaches, the channels form weak lines along which the reinforcement is easily torn into two or more parts, i.e. into longitudinal stripes.

The practice has shown that the present day unidirectional reinforcements have several problem areas, like for instance:
 a) the unidirectional reinforcement has in its basic, powder bonded form, extremely limited permeability to resin in general and especially in transverse direction, therefore the production of lengthy objects is extremely challenging,
 b) if the permeability is improved by longitudinal flow passages of the prior art teachings for the resin, the reinforcement loses its transverse stability,
 c) transverse thick twisted multifilaments aimed at providing flow passages for resin and being arranged between and transverse to the unidirectional reinforcements force the rovings too far from another and result in high risk of micro cracks, and vacuum pressure compresses the multifilaments resulting in much less effective diameter, i.e. Z-direction thickness,
 d) flattened transverse yarns prevent resin from flowing in these flow passages,
 e) gas bubbles or dry regions between the filaments of UD rovings remain easily in the stack of reinforcement and cannot be removed even in vacuum infusion, whereby they may considerably reduce the strength of the end product even further, and
 f) thermoplastic coating and hot-melt glue conflicts with the resins used in the infusion at least locally.

The above discussed problems are discussed in a co-pending patent application of the present assignee. At least some of the discussed problems are solved by using transversally oriented thin discrete means for forming flow passages for resin in connection with the unidirectional reinforcing rovings in order to arrange free flow area in a direction transverse to the direction of the unidirectional rovings both for the air to escape from the reinforcement and for the resin to impregnate or wet-out the product efficiently.

The unidirectional reinforcements of the co-pending patent application are used for the manufacture of fiber reinforced composites, for instance spar cap laminates for wind turbine blades, by one of resin transfer molding process and vacuum infusion molding process, the unidirectional reinforcement comprising continuous unidirectional rovings arranged in a longitudinal direction of the reinforcement and bonded to each other by a thermoplastic and/or thermoset binder, the reinforcement having a top surface and a bottom surface and being provided with means for facilitating, when wetting-out a stack of reinforcements, the impregnation of the reinforcement with resin in a direction transverse to the direction of the unidirectional rovings, wherein the impregnation facilitating means are thin discrete means for forming flow passages for resin arranged transverse to the unidirectional rovings, the thin discrete flow passage forming means forming to the sides thereof transverse flow passages extending from one longitudinal edge of the unidirectional reinforcement to the opposite longitudinal edge thereof. By the longitudinal edges of the reinforcement are understood in this description edges of the web-like product extending in the machine direction, i.e. in the direction of the UD-rovings.

The co-pending patent application discusses also a method of producing a unidirectional reinforcement for the manufacture of fiber reinforced composites by resin transfer molding process or vacuum infusion molding processes, the method comprising the steps of: laying continuous rovings unidirectionally side by side in one layer for forming a unidirectional web; applying thermoplastic and/or thermoset binder on the web; activating the binder for bonding the rovings together to form a unidirectional reinforcement, and laying thin discrete flow passage forming means in a direction transverse to the direction of the unidirectional rovings on the continuous unidirectional rovings.

However, performed tests have shown that the positioning and especially attaching of the thin discrete flow passage forming means on the unidirectional reinforcement such that they maintain their position from the manufacture of the reinforcement up to the final position of the reinforcement in the mold is an extremely challenging task. If the thin discrete flow passage forming means get separated from the surface of the unidirectional reinforcement, they very easily move sideways and are not at their original place to take care of the local resin flow. This can lead to serious disturbance in overall resin flow properties. It is also possible that the thin discrete flow passage forming means totally break leaving local areas without infusion functionality leading to serious problems in the end quality of the product.

The typical way to use this kind of a reinforcement is such that one reinforcement layer after another is unwound from a big roll and placed in mold which may be 60 m long and 1 m wide having up to 60 layers. The layers are carefully shifted sideways to be placed exactly in their right position.

Thus, there is considerable abrasion between the layers and good adhesion of the thin discrete flow passage forming means is important.

In other words, as the fastening of the thin discrete flow passage forming means on the unidirectional reinforcement are subjected to abrasion in various directions when rolling, unrolling, cutting and placing the reinforcement in the mold, a risk that the thin discrete flow passage forming means detach from the surface of the reinforcement is high. If the flow passage forming means detach from the surface and move sideways, break or both, the impregnation of the stack of reinforcements is hampered and a risk of incomplete impregnation and air bubbles remaining in the stack of reinforcements is high resulting in reduced product quality.

Another problem the performed test have shown relates to a phenomenon called "crystallisation" the monofilament polymer and/or polymer binder may be suffering. It means that the polymer structure is gradually arranging itself into a more organized structure which reflects in lowering adhesion. The speed of change in the polymer structure varies considerably between different polymers, i.e. from minutes to months.

Good adhesion of the thin discrete flow passage forming means is vital for the whole concept.

Definitions

The following illustrative explanations are provided to facilitate understanding of certain terms used frequently in the specification and claims discussing the present invention. The explanations are provided as a convenience and are not meant to limit the invention.

Areal weight—Weight (mass) per unit area of a single ply of dry reinforcement fabric.

Binder—A polymer material in various forms like powder, film or liquid. The binders may be made of one or several individual binders having different characteristics in chemical or physical properties like stiffness, melting point, polymeric structure, Tg etc. Binder is used to fix together the fiber structure to form a web and finally the reinforcement. Suitable binders are thermoplastic epoxies, co-polyesters, bisphenolic unsaturated polyesters, or their mixtures, just to name a few examples.

Discrete means—a thread-like "one-dimensional" means to make a clear distinction from webs, nets or scrims, i.e. "two-dimensional" means.

Fabric—a flexible woven material consisting of a network of natural or man-made artificial fibres often referred to as thread or yarn. Fabrics are formed, for example, by weaving, knitting, crocheting, knotting, needling or pressing fibres together (felt).

Laminate—A material that can be constructed by impregnating one or more layers of reinforcement using appropriate resin and hardener mixture and let it harden either by chemical reaction or cooling down of temperature. The laminate is a fiber reinforced structure made of a matrix reinforced by fine fibers of for instance glass, carbon, aramid etc. The matrix may be a thermosetting plastic (most often epoxy, polyester or vinylester) or a thermoplastic. Common end uses of glass fiber reinforcements include boats, automobile parts, wind turbine blades, etc.

Matrix—material that binds together the reinforcements to form a composite. Composites use specially formulated polymers, like thermosetting epoxy, vinylester or unsaturated polyester resin, and phenol formaldehyde resins or a thermoplastic resin (see 'Polymer') just to mention a few examples.

Monofilament—A yarn composed of a single continuous filament typically made of synthetic material, such as polyamide (nylon), polyethylene terephthalate, polypropylene, polybutylene terephthalate etc.

Multi-axial reinforcement—A reinforcement formed of two or more layers of reinforcing rovings, where the rovings in one layer are unidirectional but rovings of adjacent layers form a certain angle, usually 45, 60 or 90 degrees.

Multifilament—A yarn or thread composed of a multitude of continuous filaments typically made of synthetic material, such as polyamide (nylon), polyethylene terephthalate, polypropylene, polybutylene terephthalate etc. Especially, in connection with the present invention, multifilament means a bundle of filaments that may or may not be twisted and that have not been bonded to one another, but may, unless heavily twisted, move sideways when subjected to compression.

Polymer—Generally includes, for example, homopolymers, copolymers, such as for example, block, graft, random and alternating copolymers, terpolymers, etc., and blends and modifications thereof. Furthermore, unless otherwise specifically limited, the term "polymer" includes all possible geometrical configurations of the material. These configurations include, for example, isotactic, syndiotactic and random symmetries.

Reinforcement web—a web comprising of reinforcing fibers, the fibers being anchored to one another by appropriate means. Often manufactured as continuous webs. There are several ways to manufacture the reinforcement in unidirectional or multi-axial or random orientations, e.g. through the textile processing techniques of weaving, knitting, braiding and stitching or by bonding with an appropriate binder.

Reinforcing yarns—yarns used together with a matrix in the manufacture of composite materials. The yarns are bundles of fibers collected together with or without twist. The fibers are usually man-made fibers like glass (including all its variants), carbon (with all its variants) or aramid, which may be used as both continuous filaments and non-continuous fibers. Also wide range of natural fibres such as sisal, flax, jute, cocos, kenaf, hemp or basalt, just to name a few, have been used.

Resin Transfer Molding (RTM)—A process having two mold surfaces by which a resin is pumped typically at low viscosities and low or high pressures into a closed mold die set containing often a preform of dry reinforcement, that is, to infuse resin into the preform and to make a fiber-reinforced composite part.

Roving—a long and narrow untwisted bundle of continuous fibres or filaments, particularly glass fibres. In this application synonym to tow, whereby the selection of fibres not only contain glass fibres but also carbon, basalt and aramid fibres, more generally man-made continuous fibres.

Roving group or tow group—one or more tows or rovings that are closely spaced.

Stitching yarn—A yarn formed of 24 or 48 individual filaments made of texturise polyester. Stitching yarn used normally in the manufacture of unidirectional reinforcements has typically a linear mass density of 76 or 110 dtex. The diameter of an individual filament is, typically, 5-10 µm.

Tex number—An SI-unit of measure for the linear mass density of yarns and is defined as the mass in grams per 1000 meters. Tex is more likely to be used in Canada and Continental Europe, while denier remains more common in the United States and United Kingdom. The unit code is "tex". The most commonly used unit in connection with man-made synthetic fibers is actually the decitex, abbreviated dtex, which is the mass in grams per 10,000 meters.

Textile—general definition for various types of articles including sheets, webs, fabrics and mats having one or more layers, the layers being formed of uni- or multidirectional threads Thermoplastic—A polymer that is fusible, softening when exposed to heat and returning generally to its unsoftened state when cooled to room temperature. Thermoplastic materials include, for example, polyvinyl chlorides, some polyesters, polyamides, polyfluorocarbons, polyolefins, some polyurethanes, polystyrenes, polyvinyl alcohol, caprolactams, copolymers of ethylene and at least one vinyl monomer (e.g., poly (ethylene acetates), cellulose esters and acrylic resins.

Thermoset—A polymer material that irreversibly cures. The cure may be done through heat (generally above 200 Celsius), through contact to a chemical substance (two-part epoxy, for example), or irradiation such as electron beam processing.

Thread—twisted bundle of unitary filaments, yarn.

Tow—In the composites industry, a tow is an untwisted bundle of continuous filaments, and it refers to man-made fibres, particularly carbon fibres (also called graphite). Tows are designated by the number of fibers they contain, e.g., a 12K tow contains about 12,000 fibres. Here synonym to roving.

Transverse handling stability—A force that prevents a unidirectional reinforcement from being deformed or torn into pieces. Needed when positioning a reinforcement in a mold on top of another reinforcement and moving the reinforcement in a direction transverse to its longitudinal direction.

Unidirectional (UD) reinforcement—Reinforcement in which all of the rovings or tows run in the same direction, in this particular case in longitudinal direction. There are transversally unidirectional reinforcements, too. These rovings are often in prior art UD reinforcements bound by means of stitching and typically using some additional light layer of chopped strands or continuous multifilament yarns to hold the rovings together and to prevent their tearing into bundle formation, or by weaving where weft yarn gives the stability. The weft yarn may also be hot-melt coated. Another way of binding the rovings or tows together is the use of a binder, for instance a thermoplastic or thermoset binder. Also in that case above mentioned additional stabilizing layers may be used.

Vacuum Infusion—A process using a one-sided mold that shapes the end product. On the lower side is a rigid mold and on the upper side is a flexible membrane or vacuum bag. When vacuum/suction is applied to the mold cavity, air escapes from the cavity, whereafter resin is allowed to be infused by the suction (or additionally assisted by small overpressure at the feed side—a feature characteristic to light RTM) to completely wet-out the reinforcements and eliminate all air voids in the laminate structure.

Wet-out distance—The position of the flow front or actually the distance measured from the place resin entered the reinforcement stack to the present position.

Yarn—A long continuous length, often twisted, multifilament, suitable for use in the production of textiles, sewing, crocheting, knitting, weaving, stitching, embroidery and rope making. Yarns may be made of continuous or non-continuous natural or synthetic fibers.

Z-direction—The direction perpendicular to the plane of the layer or the stack of layers, i.e. thickness direction.

BRIEF SUMMARY OF THE INVENTION

An object of the present invention is to offer a solution to at least one of the above discussed problems.

Another object of the present invention is to develop a novel unidirectional reinforcement having excellent permeability to resin in a direction transverse to the reinforcing filament orientation.

A further object of the present invention is to develop a novel unidirectional reinforcement having excellent capabilities to allow air to escape from a stack of reinforcements during vacuuming/degassing and subsequent wetting-out the stack with resin in a direction transverse to the reinforcing filament orientation.

A yet further object of the present invention is to develop a novel unidirectional reinforcement where the thin discrete flow passage forming means are secured on the surface of the reinforcement such that they do not detach from the surface during the handling of the reinforcement.

A still further object of the present invention is to develop a novel unidirectional reinforcement having excellent permeability to resin in a Z-direction, i.e. in a direction at right angles to the plane of the reinforcement, i.e. in the thickness direction.

At least one of the above discussed problems is solved and at least one of the objects of the present invention met with a unidirectional reinforcement for the manufacture of fiber reinforced composites by the Closed Mold Method, like for instance, resin transfer molding (RTM) process, light RTM process and vacuum infusion molding process, the unidirectional reinforcement comprising continuous unidirectional rovings arranged in a longitudinal direction of the reinforcement and bonded to each other by a thermoplastic and/or thermoset binder, the reinforcement having two longitudinal edges, a top surface and a bottom surface, wherein the unidirectional reinforcement comprises discrete means for facilitating resin flow in both transverse and Z-directions, the discrete resin flow facilitating means running in transverse direction back and forth between the longitudinal edges of the reinforcement, traveling between the top and the bottom surfaces of the reinforcement and forming flow passages for resin to the sides thereof.

At least one of the prior art problems is solved and at least one of the objects achieved by means of a method of producing a unidirectional reinforcement for the manufacture of fiber reinforced composites by the Closed Mold Method, like for instance, resin transfer molding process or vacuum infusion molding processes, comprising the steps of:

a) laying continuous rovings unidirectionally side by side in at least two sheets,
b) keeping the sheets separate in vertical direction by leaving a vertical gap between the sheets,
c) organizing the unidirectional rovings of each sheet to groups of rovings having empty spaces therebetween, each group having at least one roving,
d) introducing discrete means for facilitating Z-direction resin flow in the vertical gap between the sheets,
e) making the discrete Z-direction resin flow facilitating means run in transverse direction back and forth between longitudinal edges of the sheets,
f) taking the sheets and the discrete Z-direction resin flow facilitating means therebetween to between means for forming the sheets to a unitary web having a top surface and a bottom surface, whereby the discrete Z-direction resin flow facilitating means are made to travel between the groups of rovings and between the top and bottom surfaces of the unitary web, g) applying thermoplastic and/or thermoset binder (at 124) to the sheets (122', 122") after step a), and h) activating the binder for bonding the rovings together to form a unidirectional reinforcement.

Other characteristic features of the unidirectional reinforcement of the present invention and the method of its manufacture are disclosed in the appended patent claims.

With the present invention at least some of the following advantages may be reached

- the stitches and transverse binding yarns are replaced by means of a binder system whereby harmful kinks caused by stitches are avoided, whereby
- the strength properties of the reinforcement are improved, as the reinforcing fibers remain straight,
- the production speed is not limited by stitching mechanism,
- the permeability of unidirectional reinforcements to resin is improved to such a level that facilitates good resin flow,
- simultaneously with the wetting-out of the product, remaining air escapes from the product so that, in practice, no gas bubbles or dry regions between the UD-filaments are left in the product after impregnation,
- the distance the resin advances in transverse direction is increased considerably, in the performed experiments to at least 2.5-fold compared to stitched unidirectional reinforcements and much more compared to non-stitched unidirectional reinforcements,
- the time needed for the impregnation is reduced considerably, in the performed experiments to at least one sixth of the time needed with prior art reinforcements,
- the drawbacks of a stitched structure are minimized,
- the end product has excellent strength and fatigue properties.
- the drawbacks relating to chemical disturbances with matrix are minimized,
- no need to use particular transverse reinforcing fibers or binding yarns for achieving sufficient transverse stability,
- a powder bonded UD-reinforcement is able to lay flat in the mold even when the stack of reinforcements is positioned in a concave mold, as its flexibility is reduced. This property greatly reduces the risk of formation of folds or local areas of reinforcement rovings forming small curvature bends inside the laminate,
- now that local folds and kinks are prevented from forming by powder bonding, this reinforcement is specifically suitable for carbon fiber based laminates. The reason is that local folds and kinks would reduce dramatically the compression strength properties of carbon fiber laminates, and
- now that the thin discrete flow passage forming means are secured on the surface of the reinforcement by means of yarns running transverse to the thin discrete flow passage forming means, the high quality of both the reinforcement and the end product made of the reinforcements is ensured.

BRIEF DESCRIPTION OF DRAWING

In the following, the unidirectional reinforcement of the present invention and the method of its production are discussed in more detail with reference to the appended figures, in which FIGS. 1a and 1b illustrate schematically a comparison between the behaviors of a thin discrete flow passage forming means, in this case a monofilament, and a multifilament yarn under compression between two reinforcements or layers of rovings, FIG. 2 illustrates schematically a prior art production process of the unidirectional reinforcement, FIG. 3 compares a prior art stitched UD-reinforcement with three different powder bonded UD-reinforcements in view of resin flow, FIG. 7 illustrates schematically a partial top view of the production process of the unidirectional reinforcement in accordance with a second preferred embodiment of the present invention, FIGS. 8a and 8b illustrate in more detail how the discrete Z-direction resin flow facilitating means of FIG. 7 is introduced to run across the unidirectional sheets, FIG. 9 illustrates schematically a partial top view of the production process of the unidirectional reinforcement in accordance with a third preferred embodiment of the present invention.

DETAILED DESCRIPTION OF DRAWINGS

Figure 3:
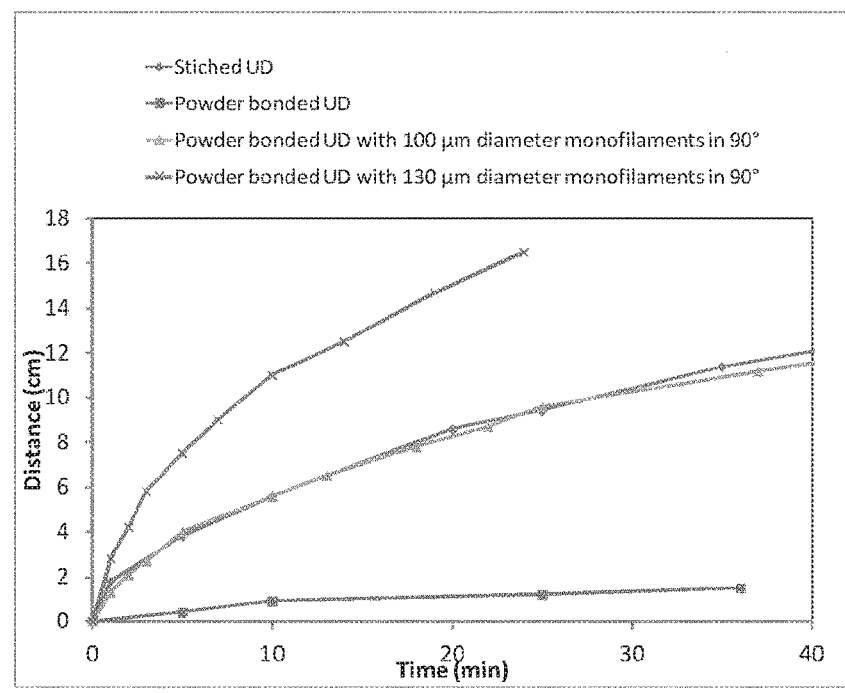

In the above four different facts concerning the arrangement of transverse flow passages for resin in connection with reinforcements have been discussed. Firstly, that the use of standard thermoplastic hot melt coated yarns, where the binder melts, is not desirable due to incompatibility of the thermoplastic material with the matrix material. Secondly, that if a thread after having been subjected to compression due to vacuum in the mold has a Z-direction thickness of 0.3-0.4 mm it is too thick, whereby the risk of creating micro-cracks in dynamic loading in the end product is high. Thirdly, that a multifilament thread without coating gets flat or oval under compression thereby destroying the resin flow properties. Fourthly, the manufacture of lengthy reinforced objects like for instance spar caps for wind turbine blades is, in practice, impossible without an efficient way to arrange the resin flow and impregnation of the stack of reinforcements in a direction at right angles, i.e. transverse to the direction of the unidirectional reinforcement rovings.

Due to the above facts the use of transverse thin discrete means for forming flow passages for resin of much smaller diameter were tested and the final laminates were compared with prior art laminates formed by using transverse multifilaments whose main task was to give the reinforcement transverse stability. Here it has to be understood that the phrases "thin discrete means for forming flow passages" or "thin discrete flow passage forming means" include, but are not limited to, monofilaments. Multifilaments and other continuous means could also be considered to create flow passages for resin between the reinforcement layers as long as they have a total diameter in the range discussed in the following, they do not form a woven structure with the reinforcing rovings, and they fulfill the following requirement. In other words, the multifilaments or other continuous means or their treatment and structure has to fulfill a single prerequisite. In this description the word 'continuous' when used in connection with transverse means for creating flow passages for resin is to be understood broadly, in other words, the word 'continuous', covers also flow passage creating means extending, most preferably, for the entire width of a web, or even shorter lengths of flow passage creating means as long as they are arranged such that the flow passages extend in a continuous manner from one edge of the web to the opposite edge thereof. The multifilament or the other continuous means has to act like a monofilament, i.e. it may not be compressible in the manner multifilaments usually are, i.e. by allowing the unitary filaments to move to the side under compression, whereby the cross section of the multifilament is not round but flat or ribbon like. That kind of a requirement means in practice that the multifilament has to be provided with binder in such a manner that separate unitary filaments of the multifilament melt together, or the binder bonds the unitary filaments together, in the production process during the production of the unidirectional web such that, in practice, the multifilament is changed into a monofilament like structure on the rovings and inside the laminate. After extensive testing including the comparison of both wet-out distance and fatigue testing it was learned that an optimal range for the diameter or Z-direction thickness of transversely arranged thin discrete flow passage forming means is between 100 and 200 µm, preferably between 130 and 170 µm. However, in cases with especially heavy reinforcements diameters up to 300 µm may be used. As to the above discussion relating to the diameter as well as the various discussions concerning the diameter later on in this specification it has to be understood that, in case the monofilament or thin flow passage forming means is somewhat compressible the diameter should be considered to mean the Z-direction dimension of the monofilament or thin flow passage forming means under compression, in other words due to vacuum process or RTM mold closure pressure. The tests showed that the resin flowed very quickly into the cavities and pushed all residual air away where it was trapped during the vacuuming stage and prior to starting of the infusion. When the wet-out distance of the stack of reinforcement layers having thin transverse discrete flow passage forming means having a thickness of 130 µm was compared to that of the prior art laminate having transverse yarns at 90° or +/−45 degrees to the longitudinal direction of the rovings it was observed that the wet-out distance of the stack of the UD-reinforcement layers having thin transverse discrete flow passage forming means was doubled. When the wet-out distance of the stack of reinforcement layers made of powder bonded unidirectional rovings provided with transverse thin discrete flow passage forming means having a thickness of 130 µm was compared to that of a laminate formed of powder bonded unidirectional rovings with no transverse yarns or thin discrete flow passage forming means it was observed that after a certain time period the wet-out distance of the stack of the UD-reinforcement layers having thin transverse discrete flow passage forming means was about 16-fold. Also, when the thus formed laminate was allowed to harden its fatigue properties were tested and compared with those of the prior art laminate having transverse yarns at 90° or +/−45 degrees to the longitudinal direction of the rovings, it was observed that the fatigue properties of the laminate made of the UD-reinforcement layers having thin transverse discrete flow passage forming means were clearly better than those of the prior art laminate. The only reason for the improved fatigue properties is the presence of less kinks in the reinforcing unidirectional rovings in the powder bonded UD-reinforcement and better removal of air from the stack of reinforcements resulting in less voids in the vacuum infusion stage. Thus, all process and product properties including the wet-out speed, strength and fatigue were clearly increased.

One of the performed experiments was to test whether threads, i.e. multifilaments could be used for creating the flow passages. Since it was learned in the earlier experiments that arranging a thin discrete flow passage forming means, i.e. a monofilament, having a Z-direction thickness or diameter of 130 µm did not reduce the fatigue properties of the final laminate, the experiment aimed at first finding out what kind of multifilament yarn is needed to ensure that its Z-direction dimension under compression is about the same as that of the thin discrete flow passage forming means in the earlier experiments.

FIGS. 1a and 1b illustrate schematically the cross section comparison between the behaviors of a thin discrete flow passage forming means, in this case a monofilament, and a multifilament yarn under compression of vacuum infusion process between two reinforcements or layers of rovings. FIG. 1a illustrates a cross section of two overlapping reinforcements 2 and 4 made of bundles of rovings bonded by means of thermoplastic and/or thermoset powder to one another having a monofilament 6 therebetween arranged at right angles to the UD-rovings. FIG. 1b shows the same reinforcements 2 and 4 made of bundles of rovings bonded by means of thermoplastic and/or thermoset powder to one another as a layer having a multifilament yarn 8 therebetween arranged at right angles to the rovings. FIG. 1a shows that the monofilament pushes or keeps the rovings of the reinforcements 2 and 4 apart such that open flow passages 10 are formed between the reinforcements 2 and 4 to the sides of the monofilament 6. FIG. 1b shows the rovings of the reinforcements 2 and 4 pushed apart in a manner equal to FIG. 1a, i.e. the thickness of the two reinforcements with the transverse monofilament or multifilament is the same. However, it may be seen that the multifilament yarn 8 needed for pushing or keeping the rovings apart is of totally different size and cross sectional area. It has transformed oval or flat under compression such that, in practice there are no true flow passages 12 at the sides of the multifilament yarn 8.

The reason is that the multifilament yarns are made of tens or hundreds of individual filaments, each filament having typically a diameter of 5-10 µm. When the multifilament yarn is subjected to compression pressure, i.e. in the vacuum infusion stage, in the mold, the filaments of the multifilament yarns are forced to move sideways so that the Z-direction dimension of the multifilament yarn is a fraction of the apparent original diameter of the multifilament even if it is twisted. The twist is typically quite low, of the order of 20-40 turns per meter, as it is important that resin is able to penetrate also between the filaments of twisted yarn to avoid dry spots. In accordance with performed tests it was learned that a multifilament, i.e. a polyester yarn having a thickness of 130 μm under compression with 0.5 bar (small compared to infusion compression of 0.95 bar), has a dtex number of 1120 dtex whereas a monofilament having a similar diameter of 130 μm with and without compression has a much lower dtex number of 167. A glass fiber yarn may have in the same conditions a dtex number of about 18-fold compared to that of a monofilament. Thus, it is clear that the multifilaments when compressed flat fill the empty space in the voids, which, in the beginning before compression, are formed to the sides of the multifilament. This prevents the resin flow through these voids or channels.

Yarns with high twist, of the order of 150 TPM (TPM=turns per meter) or more, could be effective in resisting the compressive effect of vacuum. Yet they are not favored in composite end use due to their slow and incomplete resin penetration properties and also due to their fibers being in coil formation with unfavorable elastic response under tensile load compared to their adjacent substantially non-twisted roving yarns. Moreover twisted yarns are stiff in character leading to kinks in reinforcing UD-rovings. When twisted yarns are used their twist is typically relatively low, i.e. of the order of 20-40 TPM, as it is important that resin is able to penetrate between the filaments of twisted yarn. This means, in view of the resin flow, that each filament moving sideways decreases the cross section of the cavity at the side of the multifilament such that the cross sectional area of the passage available for resin flow is, in practice, insignificant.

FIG. 2 illustrates schematically a prior art production process of the unidirectional reinforcement. The manufacture of a unidirectional reinforcement proceeds as follows. First a uniform web 20 of unidirectional rovings (preferably but not necessarily of glass, carbon, aramid or basalt, or flax, jute, hemp, sisal, cocos, kenaf, asbestos or other natural fibers) is formed by pulling them from the packages 22 and arranging them, by using a reed, for instance, side by side or in a controlled distance from each other depending on the targeted areal weight. From now on the word "rovings" is used to refer to all such tows, rovings, fibers etc. that are used in the manufacture of unidirectional reinforcements. Thus the rovings are arranged side by side preferably in one layer of rovings, but possibly also in several layers of rovings depending on the areal weight of the reinforcement and the tex number of the rovings used.

The web 20 is then directed to a binder application station 24. The binder may be applied by several methods. In an exemplary system the binder is a thermoplastic binder in powder form and is added on the web by device 24 for spreading the binder powder on all surfaces of the web, i.e. not only on the top surface of the web 20 but all around the individual rovings. The goal is to effectively surround the rovings by a thin but uniform layer of powder binder material. The operation of the device 24 may, for instance, be based on vibrating the web and the powder originally thereon assisted possibly by circulating air. By the use of the binder spreading device 24 the pulverous binder is prevented from staying only on the upper surfaces of the rovings, or on the top surface of the web, as would be the case with the mere scattering method. For instance, binder is needed also on the underside of the rovings, i.e. on the bottom surface of the web, to avoid the hanging of some otherwise loose rovings or filaments. Powder is further needed between the rovings to give sideways or transverse stability.

It should also be understood that there are many available methods for applying the pulverous binder into communication with the rovings.

The amount of binder has to be considered very carefully, as, in the case of unidirectional reinforcements it is the binder that provides the reinforcement, in practice, with all the transverse stability it has. However, as already discussed earlier it is a question of optimization here. The more binder is applied the better the transverse stability of the reinforcement is. But, simultaneously, the more binder is applied the more rigid the reinforcement is and the harder it is to make the reinforcement follow the contours of the mold. Thus, the amount of binder should be kept as small as possible, just to give enough transverse stability. Additionally, the amount of binder should be kept minimal to avoid any compatibility issues with the matrix. Therefore, the UD-reinforcement having thin transverse discrete flow passage forming means uses 5-30 $g/m^2$, preferably about 8-15 $g/m^2$ binder per reinforcement having an areal weight of 1000-1200 $g/m^2$. Naturally, if the areal weight is smaller also the amount of binder is lower, and vice versa.

It should, however, be understood that binders other than dry powders may also be used, like liquids and polymers rendered low viscous by heating or other means, just to mention a few examples. The binders may, thus, be called generally polymer binders. The liquid binders may be water based dispersions or other solvent based solutions or systems. Thus, since the use of the binders require different operations like heating and/or spraying of the solvent and/or evaporation of the solvent, the utilization of the binder may be called by a general term activation or activating the binder. The binder may be applied by means of spraying, extrusion (hot-melt nozzles), centrifugal spraying, etc. just to mention a few options. The polymer type may be thermoplastic or thermoset by nature or a mixture of both.

After the powder or liquid binder is spread or distributed all over the web 20 the web is taken to a device 26 introducing or laying thin discrete flow passage forming means on the web transverse to the travel direction of the web. The thin discrete flow passage forming means has a diameter of 100-300 μm, preferably of 100-200 μm, and more preferably between 130-170 μm. At this stage it has to be understood that the thin discrete flow passage forming means has to be chosen such that, even if the thin discrete flow passage forming means is somewhat compressible, the Z-direction dimension of the thin discrete flow passage forming means, when compressed in the infusion stage, is of the order of 100-300 μm, preferably of 100-200 μm, more preferably between 130-170 μm. This diameter is ideal in case the viscosity of infused resin-curing agent mixture is on the level of 200-350 mPas at room temperature. If viscosity differs clearly from this, it may be necessary to adjust the distance between adjacent thin discrete flow passage forming means or the diameter/Z-direction thickness thereof. Here in this application, both in this specific instance and in all other instances, the word 'transverse' has to be understood broadly, as the direction of the thin discrete flow passage forming means may lie between ±45 degrees, i.e. from −45 degrees to +45 degrees, from the direction at right angles to the rovings of the unidirectional web, i.e. the direction of the thin discrete flow passage forming means deviates at least ±45 from the direction of the unidirectional rovings of the web. The thin discrete flow passage forming means may be arranged on the web 20 at '26' by using a well-known yarn carriage system of multi-axial production machines, i.e. by means of a tool that travels transversely back and forth above the web laying a certain number of thin discrete flow passage forming means on the web at a time. The laying may, for instance, be facilitated with servolinear movement manipulator with thin discrete flow passage forming means feeding arrangement.

Another possible way of laying the thin discrete flow passage forming means is to arrange a rotating wheel at '26' in a plane substantially at right angles to the web round the web, whereby the wheel winds the thin discrete flow passage forming means round the web. By using the rotating wheel the thin discrete flow passage forming means are arranged simultaneously on both the top and the bottom surfaces of the web. Advantageously the thin discrete flow passage forming means are laid on the web in straight, parallel formation, i.e. the thin discrete flow passage forming means run linearly and uniformly from one edge of the web to the opposite edge thereof, in other words the thin discrete flow passage forming means, for instance, do not form loops found typically in knitting patterns. Essentially straight, i.e. linear and flat formation of thin discrete flow passage forming means across or transverse to the unidirectional reinforcing rovings ensure shortest resin flow time between the edges of the reinforcement. Irrespective of the actual location of the thin discrete flow passage forming means they are arranged at regular intervals, i.e. at about 2 to 50 mm, preferably 5-25 mm, more preferably at about 10-20 mm lateral distance from one another on one or both sides of the reinforcement. The exact distance must be optimized according to resin viscosity and web gram weight.

However, it has to be understood that the above discussion refers to the simplest method of manufacturing the reinforcement. Basically the same method may be applied in the manufacture of reinforcements having several in itself unidirectional layers. In such a case the thin discrete flow passage forming means may be placed on top and/or bottom surface/s of the reinforcement or between the layers thereof. It is also possible to manufacture binder bonded multiaxial reinforcements, which include unidirectional, biaxial, triaxial and quadraxial reinforcements having thin discrete flow passage forming means running transverse to the actual reinforcement fibers. The thin discrete flow passage forming means may originate from the original reinforcements or they may be inserted between the reinforcements when manufacturing the multiaxial reinforcement.

In another UD-reinforcement the thin discrete flow passage forming means are arranged between any two layers of rovings in a unidirectional reinforcement, i.e. not only on at least the top and/or bottom surface/s of the reinforcement, but between the layers of rovings, too. In other words, if the reinforcement comprises four layers of rovings, the thin discrete flow passage forming means may be positioned between each layer of rovings or between the second and third layer, i.e. to the center of the reinforcement. In practice, this means that the laying of unidirectional rovings for forming the web and laying the thin discrete flow passage forming means have to be performed in such a sequence that, first, a layer, or layers, of unidirectional rovings are laid, thereafter a set of thin discrete flow passage forming means, and thereafter the next layer/s of unidirectional rovings etc. Only after the desired layering of the reinforcements and the thin discrete flow passage forming means the layers and thin discrete flow passage forming means are bonded together by means of a powder or liquid binder.

Next the web having the thin discrete flow passage forming means on its surface/s is taken to an activation device 28 (for instance, a double belt laminator, known per se), used for melting the thermoplastic and/or thermoset binder. By means of other suitable devices it is possible to spray solvent on the binder or to evaporate the solvent therefrom, just to mention a few exemplary operations for activating the binder, to bond both the rovings together and the thin discrete flow passage forming means on the rovings for integrating the thin discrete flow passage forming means into each reinforcement. Thereafter the web 20 is taken to a compression stage 30 where the thickness of the reinforcement is adjusted. The compression stage 30 is performed, for instance, in at least one nip between two rolls for compressing the web in order to improve the bonding of the rovings by the molten binder and to form a unidirectional reinforcement 34 having a desired thickness. After compression at '30' the unidirectional reinforcement 34 is rolled 32 for delivery to a customer. Sometimes the reinforcement is cut to a desired width by means of a slitter winder before the final delivery.

Here, it should be understood that the above steps of activating the binder, more specifically heating the binder and laying thin discrete flow passage forming means may be performed also in opposite order, i.e. the heating step first to melt the binder, and the step of laying thin discrete flow passage forming means thereafter. In this latter option the type of thin discrete flow passage forming means may, for instance, be of such material that is not capable of withstanding the temperature of the melting step, but is introduced on the surface/s of the reinforcement while the molten binder is still in molten, or in the least tacky, state (but not at as high a temperature as in the heating step), whereby the binder is able to bond the thin discrete flow passage forming means, too. In fact, it should also be understood that it is often common practice to arrange cooling means after the heating and compressing steps to solidify the matrix material quickly.

With regard to the bonding of the thin discrete flow passage forming means to the rovings of a unidirectional web there are a few more options. An alternative is to use a bicomponent thin discrete flow passage forming means having a meltable component on the core material, or thin discrete flow passage forming means coated by means of a thin layer of binder. After either one of the thin discrete flow passage forming means is laid on the rovings or between the layers of rovings, a first option is that a the thin discrete flow passage forming means are heated such that the meltable part of the forming means is molten and the thin discrete flow passage forming means are bonded to the rovings the core being not melted and remaining in its original diameter. Here the activation, i.e. the heating of the thin discrete flow passage forming means may be performed in the step of bonding the unidirectional rovings together or in a separate (later) step. Thus, in the latter option the thin discrete flow passage forming means are laid on the rovings after the rovings have been bonded to each other. A second option is that the thin discrete flow passage forming means are sprayed with a solvent so that the binder solution is able to spread on the rovings, whereafter the thin discrete flow passage forming means are bonded to the rovings. If needed the reinforcement may be heated to speed up the evaporation of the solvent and the bonding of the thin discrete flow passage forming means.

Yet another way of bonding the thin discrete flow passage forming means to the rovings is to lay the thin discrete flow passage forming means on the rovings after the rovings have been bonded to each other, and after laying, to re-activate the binder (for instance by means of a heated roll) so that the thin discrete flow passage forming means may be bonded to the rovings with the same binder as the rovings are bonded to one another.

Still another way of bonding the thin discrete flow passage forming means to the rovings is to lay the thin discrete flow passage forming means on the rovings after the rovings have been bonded to each other, and before or after the laying of the thin discrete flow passage forming means on the rovings, to apply additional binder on the rovings (and possibly also on the thin discrete flow passage forming means) and to activate the binder so that the thin discrete flow passage forming means are bonded to the rovings with the additional binder.

The above discussed various options for arranging the laying of the thin discrete flow passage forming means on the rovings and bonding such to the rovings offers a few attractive alternatives for the manufacture of the UD-reinforcements having thin transverse discrete flow passage forming means.

A preferred alternative is to manufacture the bonded unidirectional reinforcement in one sequence and to provide the bonded unidirectional reinforcement with the thin discrete flow passage forming means in a separate sequence. In other words, the first sequence includes the steps of laying of continuous rovings unidirectionally side by side in one layer for forming a unidirectional web, applying thermoplastic and/or thermoset binder on the web, and activating the binder for bonding the rovings together to form a unidirectional reinforcement, whereafter the bonded unidirectional reinforcement may be rolled and taken to the second sequence either directly or after having been stored for a certain period of time or after having been taken to a customer.

The second sequence includes unrolling the bonded unidirectional reinforcement, laying thin discrete flow passage forming means in a direction transverse to the direction of the unidirectional rovings on the continuous unidirectional rovings and bonding the thin discrete flow passage forming means to the rovings, and, possibly, rolling the bonded unidirectional reinforcement provided with thin discrete flow passage forming means for further use. The advantage of this kind of a manufacturing process is based on the fact that the first sequence may, by nature, be run at a much higher pace than the second sequence. Thus, by separating the sequences it is possible to run both sequences at their optimal speed, and not be forced to slow down the first one. This kind of division of the production in two sequences makes it also possible that the second sequence is run at the premises of the final user of the reinforcement, i.e., for instance, by the manufacturer of the blades of the wind turbine. The use of thin discrete flow passage forming means may set new requirements to the nip/s, too. If the type of thin discrete flow passage forming means is easily compressible, either of material or of structural reasons, the nip pressure has to be considered, i.e. the thin discrete flow passage forming means shall not lose their cross sectional shape in the nip, or in the least the shape may not change too much in view of the resin flow. The options are, naturally, not to use nip/s at all, to use soft-surfaced rolls or to lower the nip pressure.

The stack of UD-reinforcements having thin transverse discrete flow passage forming means functions in the infusion stage such that infusing resin will flow through the flow passages 10 crosswise to reinforcing rovings and then penetrate between the individual reinforcement rovings or filaments and secure fast resin flow and good impregnation. During the infusion the advancing resin pushes the remaining air bubbles along the chambers or cavities in the reinforcement structure to the flow passages and finally out of the product. Both the advancing of the resin and removal of the air may additionally be facilitated by pressurizing the feed of the resin in case stiff upper molds are in use like in RTM or Light RTM (though seldom used) at the first ends of the flow passages and/or by arranging vacuum to the opposite ends of the flow passages.

The thin discrete flow passage forming means used between the reinforcement layers 2 and 4 for improving both the permeability of the stack of reinforcements to resin in transverse direction and air removal from between the stack of reinforcement layers create small flow passages 10 on both of their sides and between the reinforcing unidirectional rovings as shown schematically in FIG. 1a. The thin discrete flow passage forming means are preferably formed of polyamide (PA), co-polyamide or co-polyester (co-PET) monofilaments that may have, for instance, a round, square or oval cross section or an X- or hollow cross section. Thin discrete flow passage forming means may also be bicomponent or multicomponent ones. In other words, as the thin discrete flow passage forming means are manufactured from a suitable polymeric material by, for instance, extrusion, the cross section of the thin discrete flow passage forming means may be, in practice, chosen freely for optimizing the resin flow properties. It is advantageous to provide the thin discrete flow passage forming means with such a cross section that creates maximal geometrical cross section for the flow passage 10 or maximizes the distance between the reinforcing rovings in two overlapping layers with given volume of the thin discrete flow passage forming means, while keeping the amount of non-reinforcing material (the monofilament polymer) in minimum.

The means for creating flow passages for resin is normally a single filament having the diameter of the order of 100-300 µm, preferably of 100-200 µm, more preferably between 130-170 µm. However, the flow passage creating means have several other options. The flow passage creating means may be formed of a bundle of a few monofilaments, i.e. multifilament or other continuous means, which have for instance 3 filaments arranged in communication with each other such that a desired gap having a Z-direction dimension is left between the reinforcements when they are placed one on top of another. However, the multifilament and other continuous means or their treatment and structure has to fulfill a single prerequisite. The multifilament or other continuous means has to act like a monofilament, i.e. it may not be compressible in the manner monofilaments usually are, i.e. by allowing the unitary filaments to move to the side under compression, whereby the cross section of the multifilament is not round but flat or ribbon like. That kind of a requirement means in practice that the multifilament has to be provided with binder in such a manner that separate unitary filaments of the multifilament melt together, or the binder bonds the unitary filaments together, in the production process during the production of the unidirectional web such that, in practice, the multifilament or other continuous means is changed into a monofilament like structure on the rovings and inside the laminate.

When using such bonded thin discrete flow passage forming means, the diameter, or actually the Z-direction dimension, of the forming means is of the order of 100-300 µm, preferably of 100-200 µm, more preferably between 130-170 µm. The actual Z-direction dimension of the forming means depends on the permeability of the actual reinforcing fibers and the diameter of the fibers.

As to the shape and size of the thin discrete flow passage forming means as well as their positioning on the reinforcement layers, i.e. their lateral distance from each other, all these features (among others) have to be considered carefully in view of proper impregnation and wet-out of the reinforcement stack with resin. The resin flow passages formed to the sides of the thin discrete flow passage forming means shall not be too open so that the resin has time to impregnate into the rovings and not to flow directly from the side of the stack of reinforcement where the resin is introduced to the opposite side of the reinforcement stack. Naturally, the shorter the distance is between adjacent thin discrete flow passage forming means, the more open, i.e. larger cross-section, the transverse flow passages at the sides of the thin discrete flow passage forming means may be, and vice versa. Another thing that has to be taken into account is the thickness or gram weight of the reinforcement layer. The thicker the reinforcement layer is the more time it takes to properly wet-out the layer with resin. It is possible to adjust the permeability of the reinforcement to make sure that the individual reinforcing fibers will be well impregnated and no dry areas or voids are left between the fibers. However, irrespective of the diameter or detailed cross section or other structure of the transverse thin discrete flow passage forming means, the thin discrete flow passage forming means does not give any substantial transverse stability to the reinforcement, but in the case of a unidirectional reinforcement the stability is solely ensured by the use of appropriate thermoplastic and/or thermoset binder. Such a binder has to match, i.e. be compatible, with the matrix material and to provide the bonded reinforcement with sufficient flexibility. The latter requirement means in practice, on the one hand, that the solidified binder has to be to some degree resilient, and, on the other hand, that the amount of the binder used has to be balanced between sufficient transverse stability and sufficient flexibility of the reinforcement. Performed experiments have shown that, depending on the resin matrix used, bisphenolic unsaturated polyesters, co-polyesters and bisphenol-A based epoxy resins are preferred alternatives for the binder material. However, other powder or liquid binders that function in the desired manner may also be used. The dry amount of binder used for bonding the rovings and the thin discrete flow passage forming means together is of the order of 15-30 g/m$^2$ depending on the processing properties required.

In accordance with a further variation of a UD-reinforcement having thin transverse discrete flow passage forming means an ideal property for polymer material for the thin discrete flow passage forming means is that the material does not retard the curing or otherwise has no negative effect on the chemical, thermal or the mechanical properties of the resin, which forms the matrix. In the performed experiments thin discrete flow passage forming means of polyamide (PA), polyester (PET), phenoxy, co-polyamide or co-PET have been used. However, other materials that function in a desired manner may also be used.

Another preferred optional property for polymer material for the thin discrete flow passage forming means is such that the material is, at least partially, soluble to the resin. However, the solubility should be so weak or slow that the reinforcement has time to be impregnated by resin before the thin discrete flow passage forming means "disappear" or "collapse". However, the advantage of the at least partially soluble thin discrete flow passage forming means is that the channels formed by the thin discrete flow passage forming means vanish/disappear, and the product gets even more homogenous than when using non-soluble very thin discrete flow passage forming means. As an example of above discussed variants a bicomponent thin discrete flow passage forming means structure comprising a monofilament, or a bonded bundle of a few monofilaments, provided with an outer layer of polymer material with differing properties may be mentioned, the outer layer being soluble to the matrix material. The solubility of the outer layer is preferably chosen such that it dissolves to the resin after the resin has impregnated the stack of reinforcements. The advantage of this thin discrete flow passage forming means structure is that the core part of the thin discrete flow passage forming means itself may have a diameter of 120 μm, and the outer layer thickness of 10 μm. Thereby the diameter of the bicomponent thin discrete flow passage forming means is during the impregnation 140 μm, and after the dissolution of the outer layer 120 μm whereby the rovings in the final product get closer to each other. This minimizes even further the risk of premature laminate failure to virtually zero at the junctions between thin discrete flow passage forming means and the rovings.

The prior art has already taught, when, for instance, using for binding unidirectional reinforcement rovings to one another transverse hot-melt coated glass fiber yarns that the transverse filaments of the glass fiber yarn may break under transverse loading of the laminate and create small micro cracks as a result. Micro cracks may have adverse effects on the static and dynamic properties of the laminate, as they might serve as initiators for bigger cracks leading to visible damages in laminate structure and finally escalate to total part damage. Naturally the same risk applies to thin discrete flow passage forming means, too.

Thus the elongation at break of the thin discrete flow passage forming means should be at least the same as that of the matrix. For instance, the elongation at break of an epoxy matrix is about 6%, whereby the elongation at break of the thin discrete flow passage forming means should be more than 6%, preferably about 10%, more preferably about 20%. The exact value depends mainly on the resin type used. Another way of defining and comparing the material properties of the matrix and the thin discrete flow passage forming means is to evaluate their moduli of elasticity. In other words, in order to work properly and reliably in all applications the modulus of elasticity of the thin discrete flow passage forming means should be lower, preferably clearly lower than that of the matrix material. Since the modulus of elasticity of the matrix material like epoxy, polyester or vinyl ester is about 3 GPa, the modulus of elasticity of the thin discrete flow passage forming means should preferably be of the order of 2 GPa, or less.

The above mentioned application of the binder bonded unidirectional reinforcement in the manufacture of spar cap laminates for wind turbine blades is just one of the innumerous applications where this kind of reinforcements are applied. The UD-reinforcement having transverse thin discrete flow passage forming means finds best use where there is a need for unidirectionally oriented reinforcement with best possible mechanical properties, especially fatigue but also static properties. However, it should be understood that the binder bonded unidirectional reinforcement having thin transverse discrete flow passage forming means may be used in any application where fibre reinforced matrices are used.

FIG. 3 is an illustration comparing the resin flow properties of a prior art stitched reinforcement with that of a powder bonded UD-reinforcement and with those of the unidirectional reinforcement having two different settings of thin transverse discrete flow passage forming means. The experiment was performed such that four different reinforcements were prepared. In the manufacture of all reinforcements the same unidirectional rovings (1200 g/m$^2$) were used. As a first reference reinforcement was a stitched reinforcement having on the unidirectional rovings a multifilament E-glass yarn (200 tex, 400 filaments, each 16 μm) arranged at 10 mm spacing and at angles of +45 and −45 degrees to the direction of the unidirectional rovings. As a second reference reinforcement was a unidirectional reinforcement bonded with powder (10 g/m$^2$) and having an areal weight of 1200 g/m$^2$. In the first reinforcement thin discrete flow passage forming means in the form of monofilaments (CoPET—polyethylene terephthalate copolymer) having a diameter of 100 μm were arranged at right angles to the unidirectional rovings bonded with powder (10 g/m$^2$) and having an areal weight of 1200 g/m$^2$. The thin discrete flow passage forming means, i.e. the monofilaments were placed with 20 mm spacing. In the second reinforcement the same UD-material as in the first reinforcement was used, the only difference was that the monofilament diameter was now 130 μm.

For the experiment four equally dimensioned sheets of reinforcement was cut from each reinforcement. In each experiment the four similar sheets were stacked in a test mold on a glass sheet such that a plastic film was arranged on the upper side of the reinforcements. The package was made airtight with usual sealing mass. Thereafter the mold was subjected to vacuum of −0.95 bar, and epoxy resin having a viscosity of 300 mPas was introduced crosswise to reinforcing rovings into the mold at room temperature of 23° C. A chart was drafted by recording the wet-out distance the resin has advanced as a function of time.

FIG. 3 illustrates the distance (the wet-out distance) the resin has flown as a function of time. The lowermost plot shows the resin flow front position in a powder bonded reinforcement having no flow passages. It takes about 30 minutes for the resin to advance 1 cm. The flow front position, i.e. the wet-out distance, typically follows the well-known Darcy's law where the position is inversely proportional to square root of time. Thus there is a certain maximal value, which may be infinitely approached but never reached. Difference in permeability determines the actual distance of flow front if other parameters like viscosity and temperature are kept constant. It is worthwhile understanding that since the lowermost (prior art) plot is almost horizontal at 25-35 minutes, it is expected that even a considerable increase in the impregnation time would not increase the impregnation/wet-out distance. The next two plots represent the resin flow in the prior art stitched reinforcement and in a powder bonded reinforcement having transverse monofilaments with a diameter of 100 μm at a spacing of 20 mm. In 25 minutes the resin has advanced in both reinforcements about 9 cm and the impregnation seems to continue such that by increasing the wet-out time a final wet-out distance of above 10 cm's may be expected. The uppermost plot represents the resin flow speed in a powder bonded reinforcement having transverse monofilaments with a diameter of 130 μm at a spacing of 20 mm. In 25 minutes the resin has advanced in the reinforcements about 16 cm and the impregnation seems to continue at such a substantially steady pace that by increasing the wet-out time the final wet-out distance would easily go beyond 20 cm's.

Based on the performed experiments it is obvious that by increasing the diameter of the thin discrete flow passage forming means, in this example monofilaments, the wet-out speed and/or the wet-out distance could be increased. Naturally, in such a case, it has to be ensured that the rovings remain straight enough, i.e. that the thin discrete flow passage forming means do not push them too far apart and create a risk of micro-cracks. A practical upper limit for the thin discrete flow passage forming means diameter is somewhere in the range of 170-300 μm depending on the gram weight of the reinforcement. Another obvious way of increasing the wet-out speed and/or the wet-out distance is to bring the thin discrete flow passage forming means closer to each other, whereby the spacing could be reduced to 15 mm or 10 mm or even to 5 mm. The best combination must be evaluated for each set of parameters individually.

The above experiments show clearly the huge advantage the novel design of transverse flow passages formed by the use of thin discrete flow passage forming means bring. And as discussed already above it is not only a question of "high-speed" infusion that increases the production speed significantly, but also a question of very efficient gas removal from the stack of reinforcements ensuring void-free laminate without dry or semi-impregnated areas, and a question of a laminate that has better strength and fatigue properties than prior art laminates used for the same purposes, a question of flat, wave-free laminate cross section reducing the risk of local areas of low compression strength.

The UD-reinforcement having thin transverse discrete flow passage forming means has also been compared to prior art reinforcement in view of Tensile Modulus and Tensile Strength in both the direction of the rovings (0 degrees) and in a direction transverse (90 degrees) to the rovings in accordance with ISO standards 527-4 and 527-5. The prior art reinforcement was a 1200 g/m$^2$ stitched UD reinforcement, and the UD-reinforcement having thin transverse discrete flow passage forming means a 1171 g/m$^2$ powder bonded UD reinforcement with transverse monofilaments. Both reinforcements had epoxy resin as its lamination matrix. The following table discusses the results of the comparison, and shows how the tensile strength improved by almost 20% in longitudinal direction, and by more than 10% in transversal direction. The tensile modulus improved in longitudinal direction by almost 15% and reduced in transversal direction by 6%. The reason for the slight reduction in the tensile modulus in transversal direction is the existence of 100 g/m$^2$ glass fibers arranged in transversal direction in the prior art reinforcement.

|  | Tensile Modulus (GPa) 0 degrees (ISO 527-5) | Tensile Modulus (GPa) 90 degrees (ISO 527-4) | Tensile Strength (MPa) 0 degrees (ISO 527-5) | Tensile Strength (MPa) 90 degrees (ISO 527-4) |
|---|---|---|---|---|
| Prior art | 38.7 | 11.9 | 890 | 35 |
| UD-reinf. | 45.1 | 11.2 | 1110 | 39 |
| Difference % | 14.2 | −6.3 | 19.8 | 10.3 |

However, as already indicated earlier in this specification the fastening of the thin discrete flow passage forming means on the unidirectional reinforcement may be insufficient, i.e. not reliable enough in all possible applications of the reinforcement.

For ensuring the fastening of the thin discrete flow passage forming means on the unidirectional reinforcement, the reinforcement is provided with additional yarns running transverse to the thin discrete flow passage forming means on the unidirectional reinforcement such that the yarns are laid on and attached to the unidirectional reinforcement, after the thin discrete flow passage forming means. In other words, the additional yarns are positioned on the thin discrete flow passage forming means, or the thin discrete flow passage forming means remain between the additional yarns and the UD-rovings. Like the thin discrete flow passage forming means also the additional yarns may be arranged on at least one surface of the reinforcement, whereby the yarns are, naturally, arranged on the same surface of the reinforcement as the thin discrete flow passage forming means. Thus, each additional yarn runs on such one surface of the reinforcement that has the thin discrete flow passage forming means laid thereon, i.e. the additional yarn does not penetrate into the reinforcement but remains continuously on one surface thereof.

Figure 4:
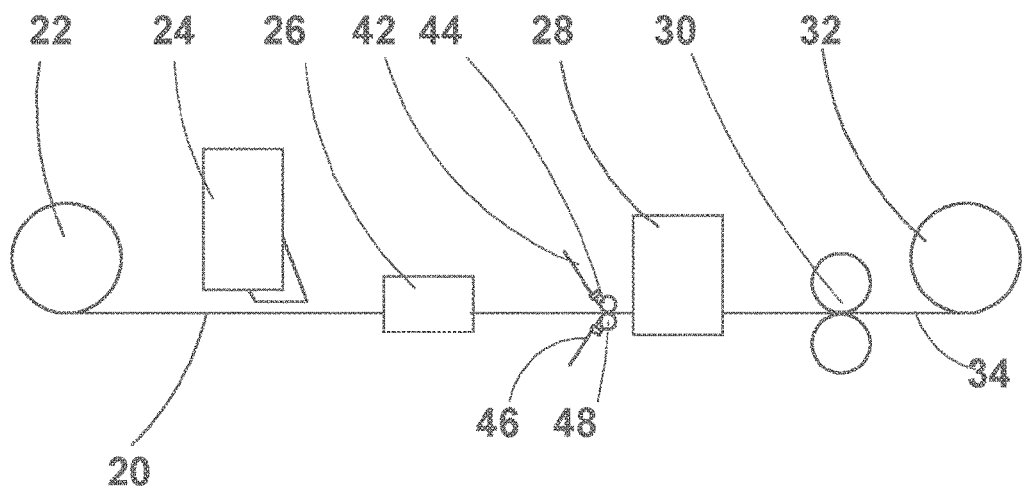
FIG. 4 illustrates schematically the production process of the unidirectional reinforcement in accordance with a first preferred embodiment of the present invention.

FIG. 4 discusses the method of manufacturing the unidirectional reinforcement in accordance with a first preferred embodiment of the present invention. Since the manufacture of the unidirectional reinforcement is, for the most part, the same as discussed in connection with FIG. 2, only the difference required by the arranging of the yarns transverse to and on the thin discrete flow passage forming means is discussed in the following. In other words, between the laying of the thin discrete flow passage forming means, in this embodiment of the present invention, on the unidirectional rovings on both sides of the web at 26 and the binder activation 28, the yarns 42 and 46 are unrolled from bobbins placed in creels arranged on both sides of the web and guided over the thin discrete flow passage forming means and the unidirectional rovings forming the web 20, the yarns having the same speed as the overall line speed. The yarns 42 and 46 are, in this embodiment of the present invention, fed from yarn creel or creels placed near the intake area of the binder activation 28 such that yarn 42 remains on the top surface of the UD-reinforcement and yarn 46 on the bottom surface of the UD-reinforcement. The yarns are fed through two separate reeds 44 and 48, one (44) for the upper surface of the web 20 and another (48) for the lower side of the web 20, to control the lateral distance between adjacent yarns. The spacing or distance between adjacent yarns 42, 46 on both surfaces of the web is preferably 5-50 mm, more preferably 10-35 mm. The direction of the yarns is preferably the direction of the unidirectional rovings of the web 20, though it is naturally possible that the yarns may be arranged at an angle to the direction of the unidirectional rovings. Since the only task of the yarns 42 and 46 is to secure the positioning of the thin discrete flow passage forming means on the web, the direction of the yarns may be chosen quite freely, as long as their direction is transverse to the thin discrete flow passage forming means.

While the web 20 is finally fed in the binder activation 28 (for instance a double belt laminator) the additional yarns 42, 46 are fixed, i.e. adhesively bonded, against the longitudinal rovings by the thermoplastic binder, which is melting by the heat of the binder activation (for instance in a laminator machine between the upper and lower belt). Thus, the thin discrete flow passage forming means are fixed lightly all over the reinforcement surface but in addition to that also nipped between the rovings constituting the actual reinforcing fibers and the additional yarns, which actually also act as reinforcing fibers.

The additional yarns are, in accordance with an optional embodiment of the present invention, kept in place by means of the thermoplastic or thermoset powder binder applied at 24 on the rovings of the web, the main purpose of such binder being the bonding of the rovings together. Another option of the present invention is the use of both the powder binder applied at 24 and the bicomponent feature of the thin discrete flow passage forming means, i.e. the outer layer of the thin discrete flow passage forming means being a meltable one. And, in accordance with yet another optional embodiment of the present invention the adhesion of the yarns 42, 46 to the web 20 may be further enhanced by application of additional binder provided on the yarns themselves. Preferably the binder is the same binder powder spread at 24 and used for bonding the rovings together to form the reinforcement 34. In other words, the additional yarns may be guided through a powder applicator chamber to coat them with additional binder to increase their adhesive properties and ensure good adhesion against the thin discrete flow passage forming means and the UD-rovings. However, also other binders, liquid or pulverous, may be applied as long as they are compatible enough with the powder binder applied at 24 and the matrix resin applied in the infusion stage.

At this stage, however, it should be understood that all the options and variations discussed above in connection with FIG. 2 concerning the fastening of the thin discrete flow passage forming means are applicable here, too. In other words, all the fastening options discussed earlier may also be used for fastening the additional yarns on the UD-rovings.

Also, it should be understood that the bonding of the UD-rovings to one another, the thin discrete flow passage forming means on the UD-rovings and the additional yarns on the thin discrete flow passage forming means and on the UD-rovings may all be performed in the same step of binder activation, in two separate steps (either the UD-rovings and the forming means in one step or the forming means and the additional yarns in one step), or in three separate steps depending on the application.

The additional yarns are preferably, but not necessarily, made of continuous or discontinuous glass fibers or polyester, polyamide, polyether, aramid or carbon fibers, natural fibers or modified (regenerated) natural fibers, metal fibers or any combination of the above fibers. Further, the additional yarns may be made of fibers of the same material as the rovings of the unidirectional reinforcement. The additional yarns may also be monofilament yarns, or, again more generally, any continuous or discontinuous fibers, mono- or multifilament textured and non-textured yarns that may be used provided that they do not interfere or reduce the resin flow along the thin discrete flow passage forming means arranged to facilitate the resin flow crosswise the reinforcement.

In case glass fiber yarns are used as the additional yarns, in principle any glass fiber yarn or roving (preferably but not necessarily starting from 22 tex yarns up to 272 tex yarns) may be used in this function. However, performed tests have shown that direct sized yarn of general type EC9 68 Z40 (E-glass, continuous, fiber diameter 9 μm, 68 tex, wound 40 turns per meter in Z-direction) is optimally suited for an UD-reinforcement having an areal weight 1200 g/m$^2$. It has good tenacity to tolerate abrasion in various yarn guides, yet it is thin enough not to disturb the surface smoothness and the overall cost is kept in minimum. Other types may be optimal for other areal weights. It is a further advantageous, though not necessary feature of the present invention, that the bending stiffness of the yarns is the same as that of the rovings of the unidirectional reinforcement whereby the shape and size of the flow passage at the sides of the thin discrete flow passage forming means is optimal. The additional glass yarns are preferably, but not necessarily, fed on all such surfaces that are provided with the thin discrete flow passage forming means.

The new method is superior in abrasion strength compared to the prior art method of adhering the thin discrete flow passage forming means on the UD-reinforcement. The method is also a simple and cost effective one.

Figure 5:
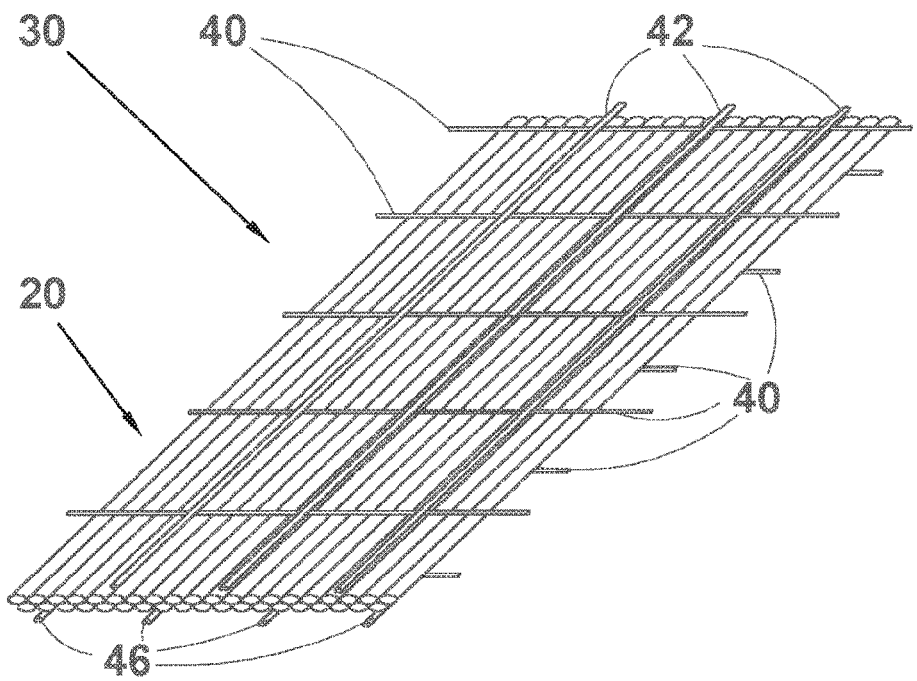
FIG. 5 illustrates a unidirectional reinforcement in accordance with a first preferred embodiment of the present invention.

FIG. 5 illustrates schematically a unidirectional reinforcement 30 in accordance with the first preferred embodiment of the present invention. The UD-reinforcement is formed of unidirectional longitudinal rovings, which are bonded by thermoplastic or thermoset binder to form a web 20. On at least one, preferably on both, i.e. top and bottom, surfaces, of the web 20 are laid thin discrete flow passage forming means 40, which run transverse to the unidirectional rovings and form resin flow passages at their sides. In accordance with the present invention longitudinal yarns 42 and 46 have been laid on the thin discrete flow passage forming means 40, on at least one, preferably on both top and bottom surfaces, of the web 20, such that the forming means 40 are left between the yarns 42, 46 and the rovings.

This far the present description has discussed transverse air evacuation and resin flow, and especially a method and means for ensuring rapid and reliable air evacuation and resin flow in a direction transverse to the unidirectional rovings, i.e. in the plane of the web. However, both air evacuation and resin flow in the Z-direction, i.e. in a direction at right angles to the plane of the web or reinforcement is almost as important as those in the transverse direction.

The following description and related FIGS. 6-12 discuss a method of improving the air evacuation and resin flow in the Z-direction of a reinforcement by using discrete means for facilitating the resin flow in Z-direction. In fact the discrete Z-direction resin flow facilitating means not only aid resin flow in the Z-direction but also in the transverse direction as the discrete Z-direction resin flow facilitating means run in transverse direction back and forth between longitudinal edges of the web by traveling between the top and the bottom surfaces of the web or reinforcement and forming flow passages for resin to the sides thereof. The discrete Z-direction resin flow facilitating means are continuous in the sense of this description, i.e. the word 'continuous' when used in connection with transverse means for creating flow passages for resin in both transverse and Z-direction is to be understood broadly. The word 'continuous' covers also flow passage creating means extending, most preferably, for the entire width of a web, or even shorter lengths of flow passage creating means as long as they are arranged such that the flow passages themselves extend in a continuous manner from one longitudinal edge of the web to the opposite longitudinal edge thereof. It should be understood already at this stage that the embodiments discussed in FIGS. 6-12 discuss mainly the first part of the manufacture of the reinforcement, i.e. the manufacture of the web 120. The thus prepared web is then later on in the production process treated by possibly adding the transverse thin discrete flow passage forming means on the web and the additional yarns on the transverse thin discrete flow passage forming means and on the UD-rovings forming the web prior to one or more steps of binder activation. Thus, all variants concerning the later stages of the manufacture of the reinforcement discussed above in connection with FIGS. 1-5 may be applied where appropriate or desired in the embodiments discussed in FIGS. 6-12. Also, issues relating to binder type, amount or application may be adopted from the above description to the embodiments of FIGS. 6-12.

Figure 6:
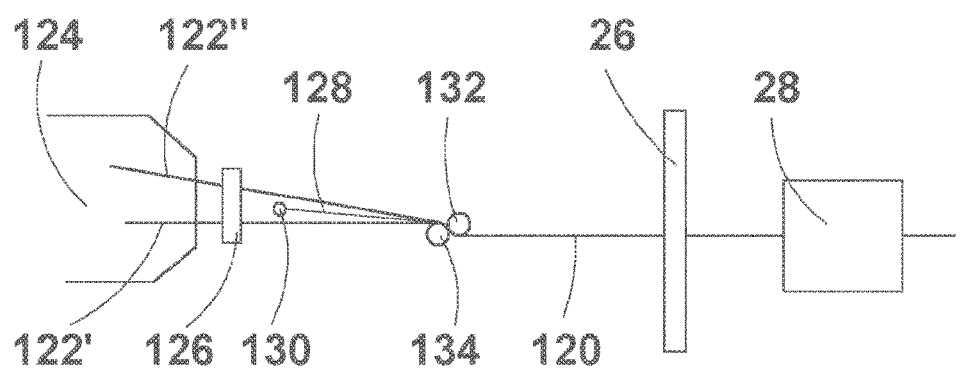
FIG. 6 illustrates schematically a partial side view of the production process of the unidirectional reinforcement in accordance with a second and third preferred embodiments of the present invention.

FIG. 6 illustrates schematically a partial side view of the production process of the unidirectional reinforcement in accordance with a second and third preferred embodiments of the present invention. Here, the web 120 is made of two sheets, i.e. a lower sheet 122' and an upper sheet 122", of unidirectional rovings. The unidirectional rovings for the two sheets are taken from a number of packages of rovings. The sheets are kept separate from one another in vertical direction, i.e. the sheets leave a vertical gap therebetween.

In accordance with one option of these embodiments, the thus formed sheets are taken through a powder binder introduction box 124, or the like powder spreading device, to a device, like a reed 126, which controls the yarn density, i.e. how close to one another the rovings of the sheets 122' and 122" are. In addition to powder, the bonding of the rovings (and the discrete Z-direction resin flow facilitating means) may be ensured by applying suitable (liquid or solid) binder by means of spraying the adhesive from nozzles or by using an adhesive film, net, web or fabric from a roll. After the sheets 122' and 122", or rather the rovings forming the sheets, are organized by the reed 126 a discrete Z-direction resin flow facilitating means 128 is introduced into the gap between the sheets 122' and 122". The discrete Z-direction resin flow facilitating means 128 is arranged to run transverse to the direction of the UD-rovings by feeding means 130. Such feeding means may, for instance, be pneumatic means or a rod moving in transverse direction to the sheets. The two sheets 122' and 122" maintain their mutual positioning, i.e. sheet 122' being the lower sheet and the sheet 122" the upper one, and the introduction of the discrete Z-direction resin flow facilitating means 128 taking place in a continuous manner in the continuously open vertical gap between the sheets 122' and 122". This is a clear difference when compared to weaving technology where the sheets would be made to change their position by the use of healds and the introduction of the transverse yarn would take place alternatingly above or below a particular sheet depending on whether the particular sheet is at that moment the lower or the upper sheet.

In another option of these embodiments, after the sheets, or rather the rovings forming the sheets, are organized by the reed, which controls the yarn density, i.e. how close to one another the rovings of the sheets are, a discrete Z-direction resin flow facilitating means is introduced into the gap between the sheets. The discrete Z-direction resin flow facilitating means is arranged to run transverse to the direction of the UD-rovings by means of a rod. The two sheets maintain their mutual positioning, i.e. one sheet being the lower sheet and the other sheet 122 the upper one, and the introduction of the discrete Z-direction resin flow facilitating means taking place in a continuous manner in the continuously open vertical gap between the sheets. This is a clear difference when compared to weaving technology where the sheets would be made to change their position by the use of healds and the introduction of the transverse yarn would take place alternatingly above or below a particular sheet depending on whether the particular sheet is at that moment the lower or the upper sheet.

Thereafter, the thus formed sheets and the discrete Z-direction resin flow facilitating means are taken through a powder binder introduction box 124, or the like powder spreading or bonding agent application device. In addition to powder, the bonding of the rovings (and the discrete Z-direction resin flow facilitating means) may be ensured by applying suitable (liquid or solid) thermoplastic and/or thermoset binder by means of spraying the binder from nozzles or by using a binder film or a binder net, fabric or web from a roll.

Next, irrespective of which one of the above options is used, the sheet—discrete Z-direction resin flow facilitating means—sheet package is taken to a nip between two rolls 132 and 134 that compress the two sheets into one web 120 as will be discussed later on. After the web 120 containing the discrete Z-direction resin flow facilitating means is prepared there are several optional ways to proceed as discussed in the following three paragraphs.

In a first option, the web may be taken directly (without the introduction of the thin transverse discrete flow passage forming means discussed in connection with FIG. 5) to an activation device 28 (for instance, a double belt laminator, known per se) shown in FIG. 4 and used for melting the thermoplastic and/or thermoset binder. By means of other suitable devices it is possible to spray solvent on the binder or to evaporate the solvent therefrom, just to mention a few exemplary operations for activating the binder, to bond both the rovings and the discrete Z-direction resin flow facilitating means together. Thereafter the web 120 is taken to a compression stage 30, as also taught by FIG. 4, where the thickness of the reinforcement is adjusted. The compression stage is performed, for instance, in at least one nip between two rolls for compressing the web in order to improve the bonding of the rovings by the molten binder and to form a unidirectional reinforcement having a desired thickness. After compression the unidirectional reinforcement is rolled for delivery to a customer. Sometimes the reinforcement is cut to a desired width by means of a slitter winder before the final delivery.

Figure 10A:
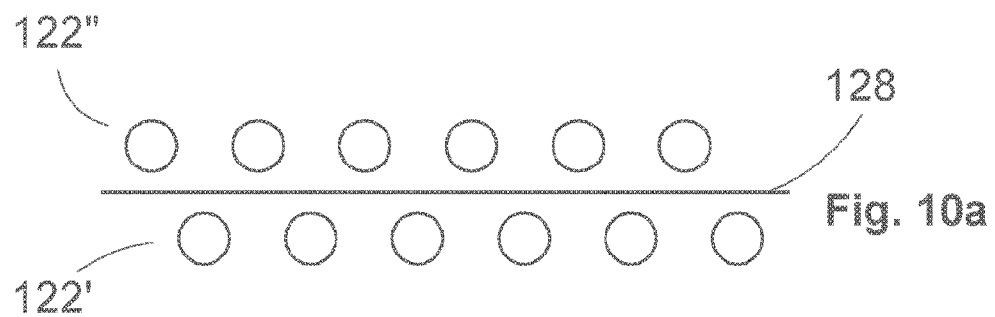
FIGS. 10a-10d illustrate in a more detailed manner but still schematically by way of end views four different phases of the production process of a unidirectional reinforcement in accordance with a second or third preferred embodiment of the present invention.
Figure 10B:
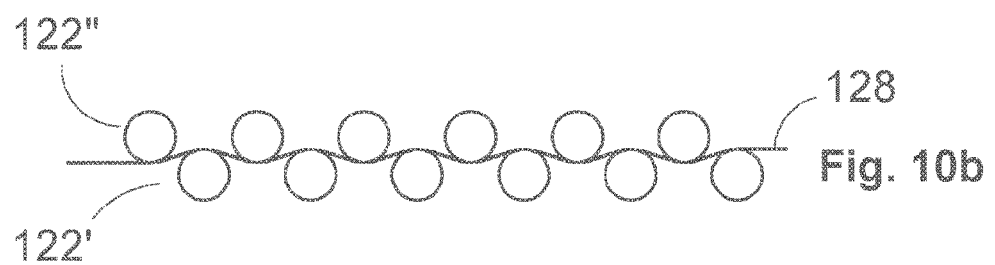
Figure 10C:
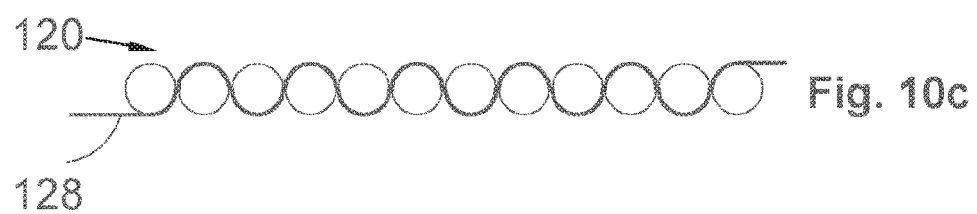
Figure 10D:
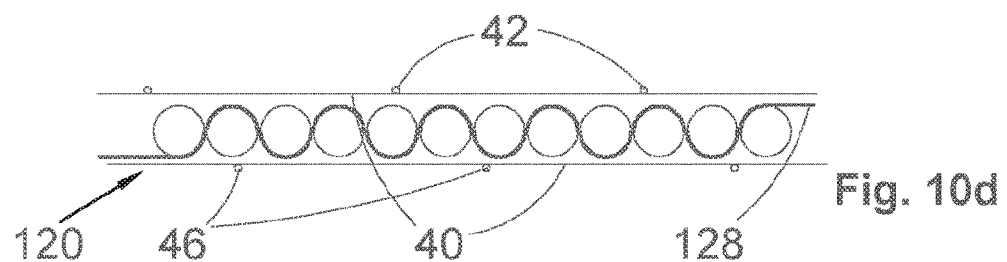

In a second option, shown in FIG. 6, the web 120 is additionally taken to a device 26 where thin transverse discrete flow passage forming means 40 are introduced on at least one surface (upper or lower), preferably on both surfaces of the web 120 as shown in FIG. 10d. Thereafter the web is taken to an activation device 28 (for instance, a double belt laminator, known per se), used for melting the thermoplastic and/or thermoset binder as taught by FIG. 4. By means of other suitable devices it is possible to spray solvent on the binder or to evaporate the solvent therefrom, just to mention a few exemplary operations for activating the binder, to bond both the rovings, the discrete Z-direction resin flow facilitating means and the thin transverse discrete flow passage forming means together. Thereafter the web 120 is taken to a compression stage 30, as also taught by FIG. 4, where the thickness of the reinforcement is adjusted. The compression stage is performed, for instance, in at least one nip between two rolls for compressing the web in order to improve the bonding of the rovings by the molten binder and to form a unidirectional reinforcement having a desired thickness and ensuring good adhesion between the various constituents. After compression the unidirectional reinforcement is rolled for delivery to a customer. Sometimes the reinforcement is cut to a desired width by means of a slitter winder before the final delivery.

In a third option the web is taken to the device 26 where thin transverse discrete flow passage forming means are introduced on at least one surface (upper or lower), preferably on both surfaces of the web, and to means introducing additional yarns 42 on top of the thin transverse discrete flow passage forming means 40 as shown in FIG. 10d. Thereafter the web is taken to an activation device 28 (for instance, a double belt laminator, known per se), used for melting the thermoplastic and/or thermoset binder as taught by FIG. 4. By means of other suitable devices it is possible to spray solvent on the binder or to evaporate the solvent therefrom, or unroll a binder net, fabric or web from a roll, just to mention a few exemplary operations for activating the binder, to bond both the rovings, the discrete Z-direction resin flow facilitating means, the thin transverse discrete flow passage forming means and the additional yarns together. Thereafter the web 120 is taken to a compression stage 30, as also taught by FIG. 4, where the thickness of the reinforcement is adjusted. The compression stage is performed, for instance, in at least one nip between two rolls for compressing the web in order to improve the bonding of the rovings by the molten binder and to form a unidirectional reinforcement having a desired thickness. After compression the unidirectional reinforcement is rolled for delivery to a customer. Sometimes the reinforcement is cut to a desired width by means of a slitter winder before the final delivery.

FIG. 7 illustrates schematically a partial top view of the production process of the unidirectional reinforcement in accordance with a second preferred embodiment of the present invention. Here the laying of the discrete Z-direction resin flow facilitating means 128 on the lower sheet 122' is shown (the upper sheet has been cut away). The discrete Z-direction resin flow facilitating means 128 is fed by feeding means, here a rod 130, moving back and forth transverse to the direction A of travel of the sheet 122'. The rod 130 of this variation feeds the discrete Z-direction resin flow facilitating means 128 to the entire width of the web 120.

Slightly enlarged FIGS. 8a and 8b illustrate in more detail the way the discrete Z-direction resin flow facilitating means is introduced between the sheets and made to run transverse to the sheets. When the feed opening for the discrete Z-direction resin flow facilitating means at the end area of the rod 130 has passed either one of the edges of the sheet 122', a pin 136 located at the edge area outside the sheet 122' is automatically raised or lifted in its operating position above the level of the sheet 122' by means of a hydraulic, pneumatic, electric or mere mechanical (for instance a cam and lever device) arrangement just behind the discrete Z-direction resin flow facilitating means 128 in relation to the direction A of travel (from the left to the right) of the sheet 122' such that the discrete Z-direction resin flow facilitating means 128 is forced to go round the pin 136, which keeps the discrete Z-direction resin flow facilitating means 128 in place up to the rolls 132/134 (FIG. 6), where the pin 136 is retracted to its lower inoperative position. In other words, the pin travels with the sheet up to the rolls 132/134. By adjusting the transverse speed of the rod in relation to the speed of the sheets in machine direction A the density of the discrete Z-direction resin flow facilitating means between the sheets is controlled. By means of the above described feed arrangement for the discrete Z-direction resin flow facilitating means the distance between neighboring discrete Z-direction resin flow facilitating means varies from substantially zero to the maximum distance when moving from one longitudinal edge of the web to the other. If it is considered that the maximum distance is too much it is, naturally, possible to increase the speed of the rod (and to match the lift frequency of the pin arrangement thereto). This corrects the problem relating to the maximum distance but the distance at the opposite edge is still substantially zero, i.e. unnecessarily small. This problem may be corrected by arranging the feeding means, for instance a rod, to take the discrete Z-direction resin flow facilitating means farther outside the edge of the sheet and arrange another pin to be raised some time after the first one, whereby the discrete Z-direction resin flow facilitating means is forced to go round both pins whereby the discrete Z-direction resin flow facilitating means appears on the sheet in a trapezoid pattern in place of more or less triangular pattern of FIG. 7. Now by adjusting the transverse speed of the rod (and the lift frequency of the pins) the shape of the pattern may be adjusted to the desired one, i.e. between a triangular pattern and an almost rectangular pattern.

FIG. 9 illustrates schematically a partial top view of the production process of the unidirectional reinforcement in accordance with a third preferred embodiment of the present invention. Here the laying of the discrete Z-direction resin flow facilitating means 138 on the lower sheet 122' is shown (the upper sheet has been cut away). The discrete Z-direction resin flow facilitating means 138 are fed by means of a rod 134 moving back and forth transverse to the direction A of travel of the sheet 122'. The rod 134 of this variation feeds the discrete Z-direction resin flow facilitating means 138 to a partial width of the web 120. Here, for instance, five discrete Z-direction resin flow facilitating means are fed simultaneously on the lower sheet 122' each discrete Z-direction resin flow facilitating means 138 covering a fifth of the width of the web 120. In FIG. 9, two discrete Z-direction resin flow facilitating means have been shown by thick lines and three by thin lines to make it easier to understand the difference between the five different discrete Z-direction resin flow facilitating means. Now, it is advantageous to arrange the discrete Z-direction resin flow facilitating means such that they overlap slightly, which ensures a continuous resin flow passage from one edge of the web to the opposite edge thereof. To be accurate, the pattern of the discrete Z-direction resin flow facilitating means shown in FIG. 9 requires that the "thick" discrete Z-direction resin flow facilitating means are fed by feeding means, or a rod, of their own, and the "thin" discrete Z-direction resin flow facilitating means by means of another rod of their own, as, to be able to create the illustrated pattern, the rods have to move in opposite directions.

FIGS. 10a-10d illustrate in a more detailed manner but still schematically by way of end views four different phases of the production process of a unidirectional reinforcement in accordance with a second or third preferred embodiment of the present invention.

FIG. 10a illustrates schematically the two sheets 122' and 122" after the rovings have been organized to sheets by means of the reed and the discrete Z-direction resin flow facilitating means 128 introduced therebetween. It is noteworthy that the rovings are, after the reed, at a distance from one another in lateral or horizontal direction, in other words, empty spaces are left between adjacent rovings. This has been achieved by arranging the rovings of the upper sheet to go through every second upper opening of the reed, the rest of the upper openings remaining empty, and the rovings of the lower sheet to go through every second lower opening of the reed, the rest of the lower openings remaining empty. However, such that the rovings in the upper and lower openings are not one above the other. In other words, the groups of rovings of the upper sheet are above the empty spaces of the lower sheet, and the empty spaces of the upper sheet are above the groups of rovings of the lower sheet. FIG. 10b illustrates schematically the sheets and the discrete Z-direction resin flow facilitating means closer to the rolls 132/134 (shown in FIG. 6) where the rovings of the upper sheet 122" have started positioning between the rovings of the lower sheet 122' and the discrete Z-direction resin flow facilitating means 128 has started traveling between the rovings of the two sheets, i.e. between the top and bottom surfaces of the web.

FIG. 10c illustrates schematically the web 120 after the rolls 132/134 (shown in FIG. 6) whereby the two sheets have been united into a web, and the discrete Z-direction resin flow facilitating means 128 runs between the rovings of the web traveling back and forth between the top and bottom surfaces of the web 120.

FIG. 10d illustrates schematically, in accordance with the above third option, the web 120 and the discrete Z-direction resin flow facilitating means 128 with the thin transverse discrete flow passage forming means 40 introduced on at least one surface (upper or lower), preferably on both surfaces, of the web 120 and the additional yarns 42 arranged on top of the thin transverse discrete flow passage forming means 40, in other words, after device 26 and the additional yarn 42/46 introduction reeds 44/48 of FIG. 4. Thereafter the web 120 is taken to an activation device 28 (for instance, a double belt laminator, known per se), used for melting the thermoplastic and/or thermoset binder as taught by FIG. 4. By means of other suitable devices it is possible to spray solvent on the binder or to evaporate the solvent therefrom, just to mention a few exemplary operations for activating the binder, to bond both the rovings, the discrete Z-direction resin flow facilitating means, the thin transverse discrete flow passage forming means and the additional yarns together. Thereafter the web 120 is taken to a compression stage 30, as also taught by FIG. 4, where the thickness of the reinforcement is adjusted. The compression stage is performed, for instance, in at least one nip between two rolls for compressing the web in order to improve the bonding of the rovings by the molten binder and to form a unidirectional reinforcement having a desired thickness. After compression the unidirectional reinforcement is rolled for delivery to a customer. Sometimes the reinforcement is cut to a desired width by means of a slitter winder before the final delivery.

Figure 11A:
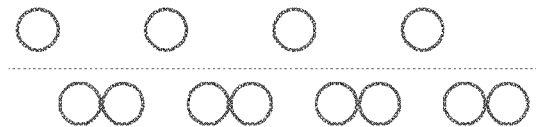
FIGS. 11a-11f illustrate by way of an end view (and comparable to FIG. 10a) various possible arrangements for running discrete Z-direction resin flow facilitating means and for grouping the rovings by means of the discrete Z-direction resin flow facilitating means.
Figure 11B:
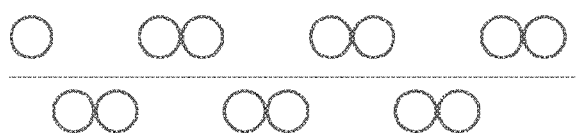
Figure 11C:
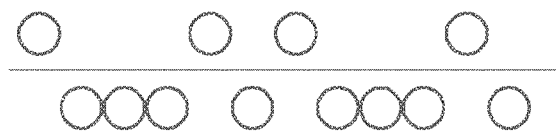
Figure 11D:
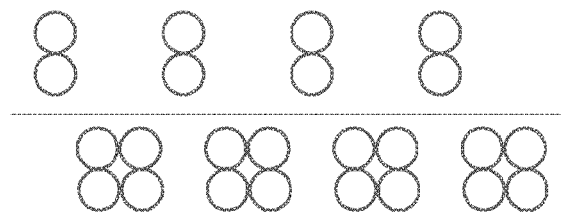
Figure 11E:
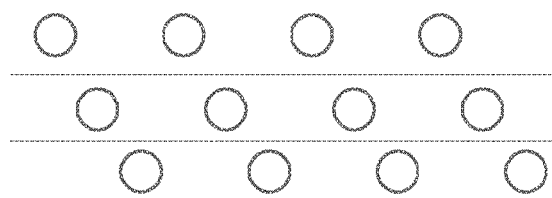
Figure 11F:
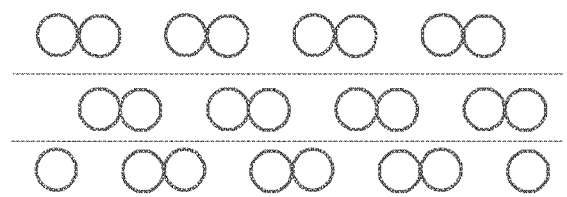

FIGS. 11a-11f illustrate by way of an end view (and comparable to FIG. 10a) various possible arrangements for running the discrete Z-direction resin flow facilitating means and for grouping the rovings by means of first the reed and then the discrete Z-direction resin flow facilitating means. The basic principle of positioning the rovings is discussed in connection with FIG. 10a. The same basic principle may be applied in all other optional arrangements of rovings, including, but not limited to the ones discussed in FIGS. 11a-11f. FIG. 11a teaches that the upper sheet may comprise unitary rovings arranged at a distance from one another, i.e. leaving empty spaces therebetween, whereas the lower sheet comprises groups of rovings (here two rovings) arranged at a distance from one another, i.e. leaving empty spaces therebetween. The groups of rovings of the upper sheet are above the empty spaces of the lower sheet, and the empty spaces of the upper sheet are above the groups of rovings of the lower sheet. FIG. 11b teaches that both sheets may comprise groups of several (here two) rovings arranged at a distance from one another. FIG. 11c teaches that the grouping of rovings in one or both sheets may change along the width of the reinforcement. FIG. 11d teaches that the groups of rovings may appear not only in side-by-side i.e. in horizontal orientation but also in one on top of another, i.e. in vertical orientation. And, as also taught in FIG. 11d, each group of rovings may contain more than one roving in lateral/horizontal direction, too. And finally, FIG. 11e teaches that the web or reinforcement may be made of more than two sheets, whereby all the above options for the unitary sheets are available for the sheets of this alternative, too. Thus, referring to FIG. 6, the web resulting from the arrangement of FIG. 11e is manufactured such that three sheets are introduced from their packages, for instance via the powder binder introduction box, to the reed, which organizes the rovings of the sheets in a desired manner. After the reed each cavity between the sheets is provided with a feeding means for introducing the discrete Z-direction resin flow facilitating means to the cavities in the manner discussed in more detail in connection with FIGS. 6, 7 and 8. FIG. 11f illustrates an alternative where three sheets and two discrete Z-direction resin flow facilitating means are used, just like in FIG. 11e. However, in this alternative the density of the rovings in the sheets is doubled such that when the sheet—discrete Z-direction resin flow facilitating means—package enters the rolls and is compressed, the resulting web is, in a way, two-layered. In other words, each empty space in a lower sheet is filled with a roving coming from above. Thereby the discrete Z-direction resin flow facilitating means do not, in this alternative, travel between the top and bottom surfaces of the web but between one surface and the horizontal centerline of the web. However, it may be considered that the discrete Z-direction resin flow facilitating means travel between the surface of the web as one discrete Z-direction resin flow facilitating means extend from one surface to the centerline and another from the centerline to the other surface. Similar approaches may be utilized in cases where there are more than three sheets making the web and the reinforcement.

Figure 12:
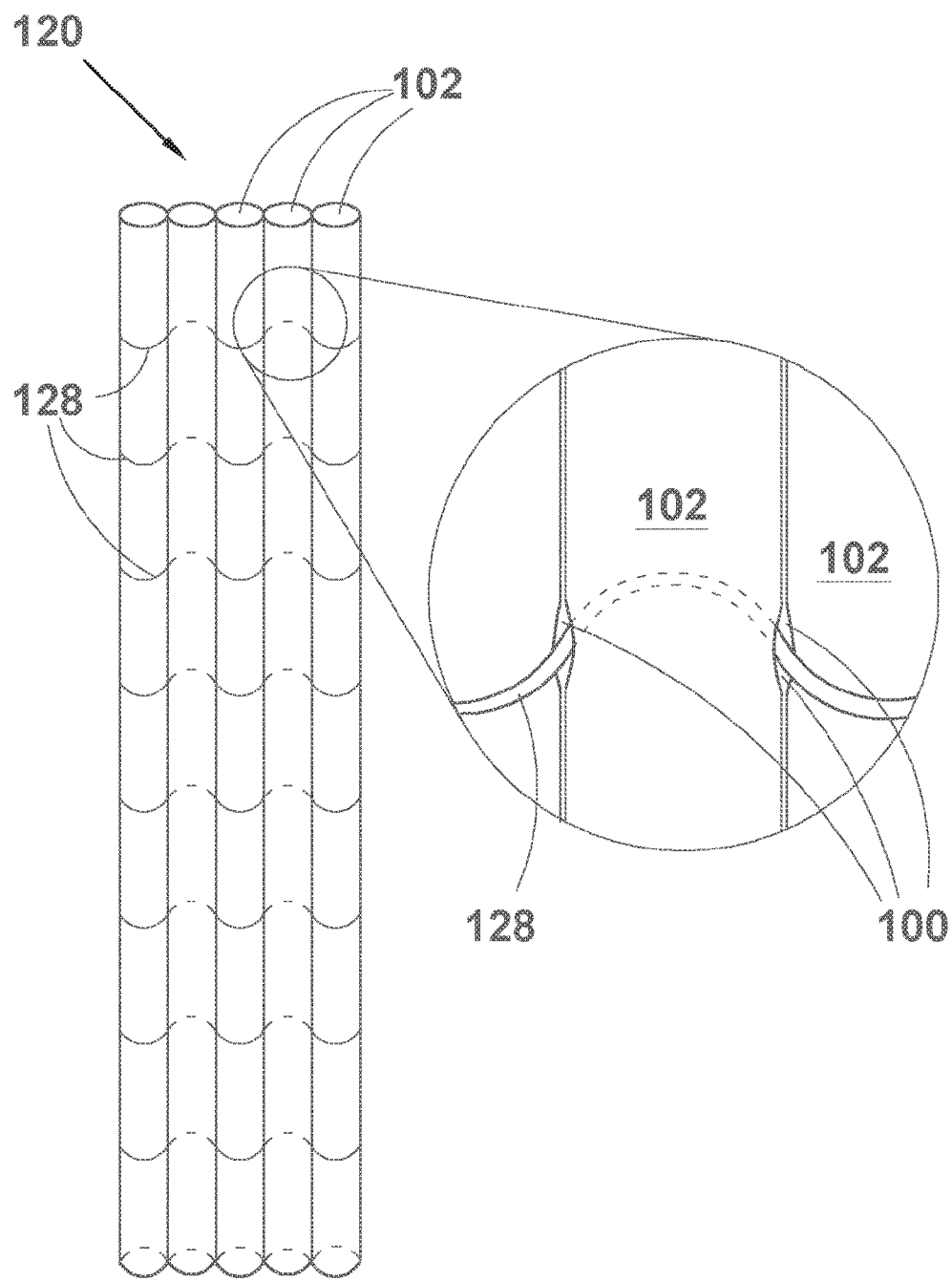
FIG. 12 illustrates a unidirectional reinforcement in accordance with a second or third preferred embodiment of the present invention.

FIG. 12 illustrates a part of a unidirectional reinforcement in accordance with a second or third preferred embodiment of the present invention. The reinforcement or web 120 is formed of unidirectional rovings 102 and a discrete Z-direction resin flow facilitating means 128 running in a predetermined manner between the rovings 102. In the enlarged drawing it has been shown how the discrete Z-direction resin flow facilitating means 128 causes the formation of open cavities 100 to the sides thereof. The cavities 100 may be called Z-direction resin flow paths, by means of which, when a layered reinforcement product is about to be manufactured, the air is evacuated efficiently from between the reinforcement layers and the package of reinforcements is impregnated with resin quickly when using one of resin transfer molding (RTM) process and vacuum infusion molding process.

The web shown in FIG. 12 may be used as such, i.e. it may be treated directly by the activation device and compression stage for forming the reinforcement, or thin transverse discrete flow passage forming means may be laid on at least one of the top surface and the bottom surface of the web prior to the treatment by the activation device and compression stage for forming the reinforcement, or the yarns running transverse to the thin transverse discrete flow passage forming means may be applied on the thin transverse discrete flow passage forming means prior to the treatment by the activation device and compression stage for forming the reinforcement.

In other words, in view of the above it should be understood that the above discussed method of arranging Z-direction flow channels in the reinforcement may be used either alone, i.e. only together with the two sheets of rovings to form a web or reinforcement as illustrated in FIG. 10c, or together with the thin transverse discrete flow passage forming means 40 shown in FIG. 10d (but without the additional yarns 42), or together with both the thin transverse discrete flow passage forming means 40 and the additional yarns 42.

The discrete Z-direction resin flow facilitating means are preferably formed of the same material as the thin discrete flow passage forming means, i.e. of polyamide (PA), co-polyamide or co-polyester (co-PET) monofilaments, or they may be bicomponent fibers, acrylic fibers or polyolefinic fibers. The discrete Z-direction resin flow facilitating means may have, for instance, a round, square or oval cross section or an X- or hollow cross section. The discrete Z-direction resin flow facilitating means may also be bicomponent or multicomponent ones. In other words, as the discrete Z-direction resin flow facilitating means are manufactured of a suitable polymeric material by, for instance, extrusion, the cross section of the discrete Z-direction resin flow facilitating means may be, in practice, chosen freely for optimizing the resin flow properties. It is advantageous to provide the discrete Z-direction resin flow facilitating means with such a cross section that creates maximal geometrical cross section for the Z-direction flow passage and simultaneously maximizes the distance between the reinforcing rovings in two overlapping layers with given volume of the discrete Z-direction resin flow facilitating means, while keeping the amount of non-reinforcing material (the monofilament polymer) in minimum.

The discrete Z-direction resin flow facilitating means is normally a single filament having the diameter of the order of 100-300 µm, preferably of 100-200 µm, more preferably between 130-170 µm. However, the discrete Z-direction resin flow facilitating means have several other options. The discrete Z-direction resin flow facilitating means may be formed of a bundle of a few monofilaments, i.e. multifilament or other continuous means, which have for instance 3 filaments arranged in communication with each other such that a desired gap is left to the sides of the discrete Z-direction resin flow facilitating means between neighboring rovings when the discrete Z-direction resin flow facilitating means is running between the rovings. However, the multifilament and other continuous means or their treatment and structure has to fulfill a single prerequisite. The multifilament or other continuous means has to act like a monofilament, i.e. it has to maintain its substantially round cross section even under compression. In other words, the multifilament or other continuous means may not be compressible in the manner multifilaments usually are, i.e. by allowing the unitary filaments to move to the side under compression, whereby the cross section of the multifilament is not round but flat or ribbon like. That kind of a requirement means in practice that the multifilament has to be provided with binder in such a manner that separate unitary filaments of the multifilament melt together, or the binder bonds the unitary filaments together, in the production process during the production of the unidirectional web such that, in practice, the multifilament or other continuous means is changed into a monofilament like structure on the rovings and inside the laminate.

When using such bonded discrete Z-direction resin flow facilitating means, the diameter, or actually the thickness, of the facilitating means is of the order of 100-300 µm, preferably of 100-200 µm, more preferably between 130-170 µm. The actual diameter or thickness of the forming means depends on the permeability of the actual reinforcing fibers and the diameter of the fibers. As to the above discussion relating to the diameter or thickness of the discrete Z-direction resin flow facilitating means it has to be understood that, in case the monofilament or other discrete Z-direction resin flow facilitating means is somewhat compressible the diameter or thickness should be considered as dimension of the monofilaments or discrete Z-direction resin flow facilitating means under compression induced by the process. In vacuum infusion process, the pressure inside vacuum bag is typically −980 mbar to −500 mbar inducing a compression on reinforcements in a level of 500 mbar to 980 mbar depending on atmospheric conditions. Compression level induced by the RTM process by mold closure pressure on reinforcements, it is typically 100 mbar to 2000 mbar. This compression level is difficult to define exactly due to large variation in process parameters and mold constructions, generally it is less in Light RTM and more in steel mold RTM.

The reinforcement of the present invention may be used with all kinds of infusion methods, including but not limited to vacuum infusion, Light RTM or RTM methods. Other lamination cases where resin impregnation is critical or otherwise retarded by tightly arranged fibers or other material present in the laminate structure like sandwich materials, fire retarding materials, fillers, pigments etc., where resin viscosity may be extremely high, may be improved by means of the reinforcement of the present invention.

The reinforcements of the present invention may be used in both manufacture of preforms or end products, i.e. laminates like for instance spar caps for wind turbine blades. The preforms may be manufactured of only one reinforcement. The reinforcement may also be made of at least two reinforcements by laying the reinforcements one on top of another such that the thin discrete flow passage forming means of a first reinforcement face the second reinforcement located below or above the first reinforcement and by using appropriate binder, if needed (sometimes mere heating of the reinforcement/s and the binder applied earlier to bond the rovings is sufficient), for bonding the reinforcements together for forming the preform. The unidirectional reinforcements may be positioned one on top of another either such that the rovings of all reinforcements are parallel resulting in a monoaxial reinforcement product or preform, or such that the rovings of a first reinforcement are arranged at an angle to the rovings of a second reinforcement, whereby a multiaxial reinforcement product or preform is formed. The preforming of the reinforcement, i.e. the manufacture of the preform may be performed by the reinforcement manufacturer, by the manufacturer of the end product or someone therebetween.

In a similar manner a laminate may be manufactured of the reinforcement of the invention or of the above discussed preform. In the method of manufacturing the laminate at least two reinforcements, or preforms, are laid one on top of another in the mold such that the thin discrete flow passage forming means of a first reinforcement face the second reinforcement located above the first reinforcement, a cover is positioned on the reinforcements, the mold is closed, and a pressure difference is provided for evacuating air from the mold and for impregnating the reinforcement/s with resin.

Another option is to use only one unidirectional reinforcement in the mold such that the thin discrete flow passage forming means are facing both the bottom and the cover of the mold.

It is clear that the invention is not limited to the examples mentioned above but can be implemented in many other different embodiments within the scope of the inventive idea. It is also clear that the features in each embodiment described above may be used in connection with the other embodiments whenever feasible.

The invention is:

1. A unidirectional reinforcement for the manufacture of fiber reinforced composites by a Closed Mold Method, the unidirectional reinforcement comprising:
    continuous unidirectional rovings arranged in a longitudinal direction of the unidirectional reinforcement and bonded to each other by a thermoplastic and/or thermoset binder, wherein the continuous unidirectional rovings include at least two sheets,
    the unidirectional reinforcement including two longitudinal edges, a top surface and a bottom surface,
    discrete means for facilitating resin flow in both transverse and Z-directions, the discrete means for facilitating resin flow in both transverse and Z-directions running in transverse direction back and forth between the longitudinal edges of the reinforcement, traveling between the top and the bottom surfaces of the reinforcement and between the at least two sheets of the continuous unidirectional rovings;
    wherein the discrete means for facilitating resin flow forms flow passages for resin and the flow passages are open at the longitudinal edges of the unidirectional reinforcement.

2. The unidirectional reinforcement as recited in claim 1, wherein the discrete means for facilitating resin flow in both transverse and Z-directions is a single filament or a bonded bundle of a few filaments.

3. The unidirectional reinforcement as recited in claim 2, wherein the discrete means for facilitating resin flow in both transverse and Z-directions has a diameter or thickness of 100 to 300 µm under vacuum infusion having a vacuum of 500 to 980 mbar or RTM compression having a pressure of 100-2000 mbar.

4. The unidirectional reinforcement as recited in claim 1, wherein the discrete means for facilitating resin flow in both transverse and Z-directions is made of polyamide (PA), co-polyamide or co-polyester (co-PET) or of a bicomponent fiber, acrylic fiber or polyolefinic fiber.

5. The unidirectional reinforcement as recited in claim 1, wherein the discrete means for facilitating resin flow in both transverse and Z-directions is a bicomponent monofilament having a meltable outer core.

6. The unidirectional reinforcement as recited in claim 1, further comprising additional means for facilitating, when wetting-out a stack of reinforcements, the impregnation of the reinforcement with resin in a direction transverse to the direction of the unidirectional rovings, the additional means for facilitating, when wetting-out the stack of reinforcements, the impregnation of the reinforcement with resin in the direction transverse to the direction of the unidirectional rovings being thin discrete means for forming flow passages for resin arranged transverse to the unidirectional rovings, the thin discrete flow passage forming means forming to the sides thereof transverse flow passages for resin extending from one longitudinal edge of the unidirectional reinforcement to the opposite longitudinal edge thereof.

7. The unidirectional reinforcement as recited in claim 6, further comprising additional yarns configured to secure the thin discrete flow passage forming means on the unidirectional rovings, the additional yarns running on and transverse to the thin discrete flow passage forming means, each additional yarn running on the top or on the bottom surface of the reinforcement and being adhesively bonded to at least the unidirectional rovings.

8. The unidirectional reinforcement as recited in claim 7, wherein the additional yarns are bonded to the unidirectional rovings by the thermoplastic and/or the thermoset binder.

9. The unidirectional reinforcement as recited in claim 7, wherein the additional yarns are provided with an additional thermoplastic and/or thermoset binder configured to secure the yarns on the unidirectional rovings.

10. The unidirectional reinforcement as recited in claim 7, wherein the additional yarns are arranged at a lateral distance of 5 to 50 mm from one another.

11. The unidirectional reinforcement as recited in claim 7, wherein the additional yarns are made of at least one of: glass, polyester, polyamide, polyether, aramid, metal or carbon fibers or natural or modified natural fibers.

12. The unidirectional reinforcement as recited in claim 7, wherein the additional yarns and the unidirectional rovings are formed of the same material.

13. The unidirectional reinforcement as recited in claim 6, wherein the thin discrete flow passage forming means has a diameter or thickness of 100 to 300 µm under vacuum infusion having a vacuum of 500 to 980 mbar or RTM compression having a pressure of 100-2000 mbar.

14. The unidirectional reinforcement as recited in claim 6, wherein the thin discrete flow passage forming means is made of at least one of: polyamide (PA), polyester (PET), phenoxy, co-polyamide or co-polyester (co-PET) or of a bicomponent fiber, an acrylic fiber or a polyolefinic fiber.

15. The unidirectional reinforcement as recited in claim 6, wherein the thin discrete flow passage forming means are bicomponent monofilaments having a meltable outer core.

16. The unidirectional reinforcement as recited in claim 1, wherein the thin discrete flow passage forming means are parallel to top surface or a bottom surface of the unidirectional reinforcement and are laid on and positioned at a spacing of 2 to 50 mm on the unidirectional reinforcement.

17. The unidirectional reinforcement as recited in claim 1, wherein the unidirectional rovings are made of at least one of: glass, carbon, aramid, basalt, kenaf, sisal, flax, hemp, jute and linen.

18. The unidirectional reinforcement as recited in claim 1, wherein the thermoplastic and/or thermoset binder is in the form of a web, a fabric, a dry powder, dispersion, or solution.

19. A unidirectional reinforcement including longitudinal edges, a top surface and a bottom surface, the unidirectional reinforcement comprising:
overlapping sheets of continuous unidirectional rovings arranged in a longitudinal direction of the reinforcement and the overlapping sheets are bonded to each other by a thermoplastic and/or thermoset binder;
monofilaments and/or groups of multifilaments between at least one adjacent pair of the overlapping sheets, wherein the monofilaments and/or groups of multifilaments each extend continuously between the longitudinal edges of the unidirectional reinforcement and extend back and forth between the unidirectional rovings along a Z-direction which is perpendicular to the sheets, and
resin flow passages extending between the overlapping sheets, wherein the resin flow passages are adjacent to and formed by the monofilaments and/or groups of multifilaments, and the resin flow passages are open at the longitudinal edges of the unidirectional reinforcement.

20. A unidirectional reinforcement including longitudinal edges, a top surface and a bottom surface, the unidirectional reinforcement comprising:
at least two sheets of unidirectional rovings including an upper sheet and a lower sheet, wherein the at least two sheets of continuous unidirectional rovings are arranged along a longitudinal direction of the reinforcement;
monofilaments and/or groups of multifilaments being positioned between the at least two sheets, wherein the monofilaments and/or groups of multifilaments each extend continuously between the longitudinal edges of the unidirectional reinforcement, wherein, after the at least two sheets are compressed into a web, the monofilaments and/or groups of multifilaments extend back and forth between the unidirectional rovings along both the lateral direction and a Z-direction which is perpendicular to the at least two sheets, and wherein the unidirectional rovings of the at least two sheets and the monofilaments and/or groups of multifilaments being bonded to each other by a thermoplastic and/or thermoset binder, and
resin flow passages extending between the at least two sheets of the unidirectional rovings, wherein the resin flow passages are adjacent to and formed by the monofilaments and/or groups of multifilaments and the resin flow passages are open at the longitudinal edges of the unidirectional reinforcement.

\* \* \* \* \*